US012793720B2

(12) United States Patent
Park et al.

(10) Patent No.: US 12,793,720 B2
(45) Date of Patent: Nov. 10, 2026

(54) AUDIO PROCESSING IN MULTI-SPEAKER MULTI-CHANNEL AUDIO ENVIRONMENTS

(71) Applicant: NVIDIA Corporation, Santa Clara, CA (US)

(72) Inventors: Taejin Park, San Jose, CA (US); Ante Jukic, Culver City, CA (US); He Huang, Greenville, SC (US); Venkata Naga Krishna Chaitanya Puvvada, San Jose, CA (US); Kunal Dhawan, San Jose, CA (US); Nithin Rao Koluguri, Milpitas, CA (US); Nikolay Karpov, Moscow (AM); Aleksandr Laptev, Erevan (AM); Jagadeesh Balam, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 237 days.

(21) Appl. No.: 18/410,794

(22) Filed: Jan. 11, 2024

(65) Prior Publication Data

US 2025/0029618 A1 Jan. 23, 2025

Related U.S. Application Data

(60) Provisional application No. 63/527,292, filed on Jul. 17, 2023.

(51) Int. Cl.
*G10L 17/18* (2013.01)
*G10L 17/02* (2013.01)
(Continued)

(52) U.S. Cl.
CPC .............. *G10L 17/18* (2013.01); *G10L 17/02* (2013.01); *G10L 17/20* (2013.01); *G10L 25/30* (2013.01);
(Continued)

(58) Field of Classification Search
None
See application file for complete search history.

(56) References Cited

U.S. PATENT DOCUMENTS 10,839,822 B2 * 11/2020 Chen ........................ G10L 25/30
11,302,347 B2 * 4/2022 Penniman ............... H04S 7/307
(Continued)

OTHER PUBLICATIONS

Wang, Zhong-Qiu, Jonathan Le Roux, and John R. Hershey. "Multi-channel deep clustering: Discriminative spectral and spatial embeddings for speaker-independent speech separation." 2018 IEEE International conference on acoustics, speech and signal processing (ICASSP). IEEE, 2018. (Year: 2018).*

*Primary Examiner* — Douglas Godbold
(74) *Attorney, Agent, or Firm* — Lowenstein Sandler LLP

(57) ABSTRACT

Disclosed are apparatuses, systems, and techniques that may use machine learning for implementing speaker recognition, verification, and/or diarization. The techniques include receiving a first set of audio data channels (ADCs) jointly capturing a speech produced by one or more speakers and obtaining, using the first set of ADCs, a second set of one or more ADCs. Individual ADCs of the second set of ADCs represent one or more channels of the first set of ADCs, and at least one channel of the second set of ADCs represents a cluster of two or more ADCs of the first set of ADCs, the two of more ADCs being selected based on similarity of audio data of the two or more ADCs. The techniques further include processing, using an audio processing neural network model, the second set of ADCs to obtain an association of the speech to the one or more speakers.

20 Claims, 14 Drawing Sheets

(51) Int. Cl.
*G10L 17/20* (2013.01)
*G10L 25/30* (2013.01)
*G10L 25/78* (2013.01)

(52) U.S. Cl.
CPC ........ *G10L 25/78* (2013.01); *G10L 2025/783* (2013.01)

(56) References Cited

U.S. PATENT DOCUMENTS

| | | | | |
|---|---|---|---|---|
| 11,558,693 | B2 * | 1/2023 | Veselinovic | H04R 1/406 |
| 12,112,759 | B2 * | 10/2024 | Chen | G10L 21/028 |
| 12,236,970 | B2 * | 2/2025 | Zeghidour | G10L 21/0316 |
| 2012/0029916 | A1 * | 2/2012 | Tsujikawa | G10L 21/0272<br>704/200 |
| 2018/0061433 | A1 * | 3/2018 | Kida | G10L 25/78 |
| 2018/0182412 | A1 * | 6/2018 | Kleijn | G10L 21/0308 |
| 2019/0341057 | A1 * | 11/2019 | Zhang | G10L 17/18 |
| 2021/0074316 | A1 * | 3/2021 | Souden | G10L 15/25 |
| 2022/0199099 | A1 * | 6/2022 | Li | G10L 21/0308 |
| 2022/0224792 | A1 * | 7/2022 | Horton | G10L 17/06 |
| 2023/0005488 | A1 * | 1/2023 | Hiroe | H04R 3/005 |
| 2023/0386505 | A1 * | 11/2023 | Nir | G10L 25/78 |
| 2024/0160849 | A1 * | 5/2024 | Fanelli | G10L 25/84 |

* cited by examiner

AUDIO PROCESSING IN MULTI-SPEAKER MULTI-CHANNEL AUDIO ENVIRONMENTS

RELATED APPLICATIONS

This application claims the benefit of U.S. Provisional Patent Application No. 63/527,292, filed Jul. 17, 2023, entitled "Multi-Speaker Multi-Channel Speech Transcription for Conversational AI Systems and Applications," the contents of which are incorporated by reference in their entirety herein.

TECHNICAL FIELD

At least one embodiment pertains to processing resources used to perform and facilitate speaker identification, verification, diarization, and/or speech recognition and transcription. For example, at least one embodiment pertains to systems and techniques that facilitate efficient automated association of speech utterances with speakers in acoustic multi-speaker environments.

BACKGROUND

Speaker identification involves associating a spoken utterance with other utterances (or some representation of those utterances) stored in a database of speakers, identifying a specific speaker who produced the spoken utterance, and/or determining that the spoken utterance was produced by a new speaker not represented in the database. Speaker verification involves determining whether two or more utterances are spoken by the same speaker or different speakers, regardless of whether the speech processing system has encountered these speakers previously. Speaker diarization involves partitioning unstructured speech episodes involving multiple speakers (e.g., a conversation, a meeting, a public event, etc.) into time-stamped utterances produced by various specific speakers (known or unknown). Speaker diarization can be performed in conjunction with speaker verification or identification, e.g., when the speakers participating in a speech episode are represented in the database of speakers. As another example, speaker diarization may be performed independently from speaker verification or identification, e.g., when one or more of the speakers cannot be recognized. Modern speaker identification, verification, and/or diarization systems often deploy trained neural network models.

DETAILED DESCRIPTION

Figure 1A:
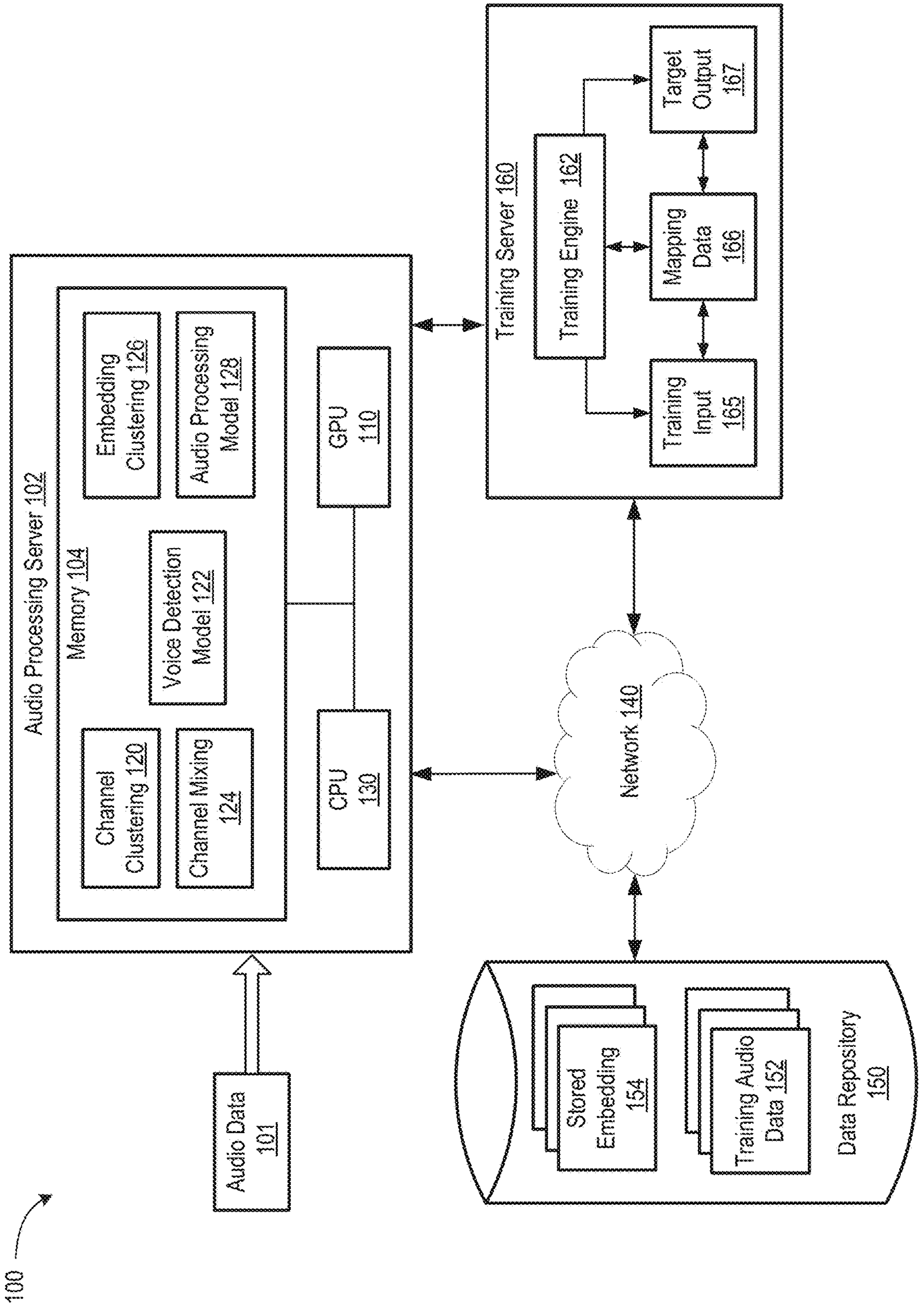
FIG. 1A is a block diagram of an example computer system capable of processing audio data collected from a variable number of audio channels and performing efficient multi-speaker identification, verification, and/or diarization, according to at least one embodiment.

Deep neural network models may be trained to process speech utterances (or portions thereof) and to output speaker embeddings (e.g., in an embedding or latent space) that can be used as digital fingerprints to identify a speaker. A speaker embedding may be viewed as a vector in a special or latent embeddings space. A well-designed and well-trained model generates embeddings for different utterances produced (spoken) by the same person that differ significantly less (in the embeddings space) than utterances produced by different people. The models then group (cluster) the generated embeddings among a plurality of clusters corresponding to different speakers based on similarity (e.g., cosine similarity) of various embeddings. Existing diarization models often perform well if a number of speakers (clusters) is known a priori. In many situations, however, the number of different speakers has to be determined by the deployed model(s) on the fly. Furthermore, complex audio environments can have multiple audio sensing devices (some having a plurality of microphones) distributed around a wide area and can capture audio signals (channels) produced in respective locales of these environments. As sound sources (people or noise sources) move around the environment, different channels can capture target speech signals more effectively at one time but capture mostly noise and/or undesired speech signals at another time, as the proximity of speakers and noise sources to various devices (microphones) changes. Existing systems and techniques have a limited success in audio recognition tasks (e.g., speaker identification, speaker verification, diarization, and/or the like) with a variable/unknown number of audio capture devices (microphones/channels), speakers and/or noise sources.

Aspects and embodiments of the present disclosure address these and other technological challenges by providing for techniques and systems that allow for performance of various audio recognition tasks without prior knowledge of a number, arrangement, and/or type of audio capture devices, including but not limited to individual distributed microphones and arrays of microphones (e.g., microphones arranged into linear, circular, and/or any other spatial patterns). More specifically, an arbitrary number $N_0$ of microphones may generate the corresponding number of audio data channels that are preprocessed (e.g., noise-filtered), digitized, and then processed by a channel clustering component that identifies a number N of channel clusters (where $N \leq N_0$) representative of distinct local audio environments. For example, a given channel cluster may be associated with one or more microphones that detect (at a given instance of time) substantially similar audio content. More specifically, channels whose audio data has a high degree of similarity may be grouped into a single channel cluster whereas a channel whose audio data is distinct from data of other channels may be assigned to a separate channel cluster. The audio data of channels grouped into a given channel cluster can be pooled (e.g., averaged, max-pooled, or processed using a neural model) into a single combined channel. The number N of combined channels need not be fixed in advance and may change (e.g., from 1 to $N_0$) depending on a specific environment, placement of audio capture devices, and/or positioning of audio sources present in the environment.

The N combined channels may be processed by a suitable embeddings model that applies a sliding window (e.g., 0.05-5.0 sec window, in one example non-limiting example) to the channel audio data and represents the audio data in that sliding window via an embedding (feature vector) that captures audio features of the audio data, such as spectral features, cadence, volume of audio, and/or the like. In some embodiments, the embeddings may be processed by a voice activity detector, e.g., a model that associates, with individual embeddings, a likelihood (e.g., a probability or a logit likelihood) that the respective embeddings are associated with speech (as opposite to noise or various non-speech sounds). The voice detection likelihoods may be used to eliminate non-speech audio fragments from the processing pipeline. Processing of the N combined channels can be performed using a variety of techniques.

In one embodiment, referred to as channel mixing herein, channels characterized by the voice detection likelihoods below a certain minimum value may be discarded (for a particular instance of time or frame) while the embeddings of the remaining combined channels may be aggregated into mixed embeddings, e.g., by weighting embeddings of individual combined channels with weights determined, e.g., by the voice detection likelihoods. The mixed embeddings may then be processed by a suitable audio processing model, which performs one or more of a speaker identification, speaker verification, diarization, and/or the like.

In another embodiment, referred to as embedding clustering, all remaining N combined channels may initially be maintained and relative distances, in an embeddings space, between the N embeddings (for each instance of time/frame) may be computed. For example, a centroid point for the N embeddings may be obtained and distances from the N embeddings to the centroid point may be determined. A certain (e.g., pre-set) number K of embeddings with the lowest distances from the centroid point may be maintained while the other N-K embeddings having the longer distances from the centroid point main be eliminated. The K remaining embeddings may then be aggregated (e.g., concatenated) into an aggregated embedding, which may then be processed by the suitable audio processing model. Numerous additional embodiments are disclosed herein.

The advantages of the disclosed techniques include but are not limited to an ability of audio processing pipelines to efficiently and reliably perform a variety of audio processing tasks in multi-channel multi-speaker environments. Various modules and components of the disclosed systems, such as channel mixing, voice detection, embedding clustering, and/or the like, take inputs of arbitrary dimensions (e.g., arbitrary number of channels), and generate fixed-sized embeddings for processing by a trained audio processing model. This enables transcribing complex multi-speaker meetings without imposing stringent requirements on the types and placement of the recording equipment. The disclosed techniques facilitate live event transcription and enable efficient deployment of conversational artificial intelligence (AI) in realistic environments. For example, AI-powered services, such as AI-customer interactions, may occur in a busy store, with multiple customers moving and speaking at the same time and multiple recording devices being used for optimal speech capture, with the disclosed techniques ensuring accurate and fast (including live) transcriptions.

System Architecture

FIG. 1A is a block diagram of an example computer system 100 capable of processing audio data collected from a variable number of audio channels and performing efficient multi-speaker identification, verification, and/or diarization, in accordance with at least some embodiments. As depicted in FIG. 1A, a computing system 100 may include an audio processing server 102, a data repository 150, and a training server 160 connected to a network 140. Network 140 may be a public network (e.g., the Internet), a private network (e.g., a local area network (LAN), or wide area network (WAN)), a wireless network, a personal area network (PAN), a combination thereof, and/or another network type.

Audio processing server 102 may include a desktop computer, a laptop computer, a smartphone, a tablet computer, a server, a wearable device, a VR/AR/MR headset or head-up display, a digital avatar or chatbot kiosk, an in-vehicle infotainment computing device, and/or any suitable computing device capable of performing the techniques described herein. Audio processing server 102 may be configured to receive audio data 101 that may be associated with any speech episode involving one or more speakers. Speech episodes may include a public or private conversation, a business meeting, a public or private presentation, an artistic event, a debate, an interaction between a digital agent (e.g., chat bot, digital avatar, etc.) and one or more users, an in-vehicle communication (e.g., between two or more occupants, between an occupant(s) and a chat bot, avatar, or digital assistant of the vehicle), and/or the like. Audio data 101 may be recorded using one or more devices connected to audio processing server 102, retrieved from memory 104 of audio processing server 102, and/or received over any local or network connection (e.g., via network 140) from an external computing device. Audio data 101 may be in any suitable format, e.g., WAV, AIFF, MP3, AAC, WMA, or any other compressed or uncompressed audio format. In some embodiments, audio data 101 may be stored (e.g., together with other data, such as metadata) in data repository 150. Additionally, data repository 150 may store training audio data 152 for training one or more models capable of speaker identification, speaker verification, and/or speaker diarization, according to some embodiments disclosed herein. Data repository 150 may be accessed by audio processing server 102 directly or (as shown in FIG. 1A) via network 140.

Data repository 150 may include a persistent storage capable of storing audio files as well as metadata for the stored audio files. Data repository 150 may be hosted by one or more storage devices, such as main memory, magnetic or optical storage disks, tapes, or hard drives, network-attached storage (NAS), storage area network (SAN), and so forth. Although depicted as separate from audio processing server 102, in at least some embodiments, data repository 150 may be a part of audio processing server 102. In at least some embodiments, data repository 150 may be a network-attached file server, while in other embodiments data repository 150 may be some other type of persistent storage such as an object-oriented database, a relational database, and so forth, that may be hosted by a server machine or one or more different machines coupled to the audio processing server 102 via network 140.

Audio processing server 102 may include a memory 104 (e.g., one or more memory devices or units) communicatively coupled with one or more processing devices, such as one or more graphics processing units (GPU) 110, one or more central processing units (CPU) 130, one or more data processing units (DPU), one or more parallel processing units (PPUs), and/or other processing devices (e.g., field-programmable gate arrays (FPGAs), application-specific integrated circuits (ASICs), and/or the like). Memory 104 may store one or more components and models, such as channel clustering 120 to combine channels with similar audio data 101, voice detection model 122 to identify portions of audio data 101 that contain speech, channel mixing 124 to weigh and aggregate the combined channels, embedding clustering 126 to group audio data embeddings by similarity, audio processing model 128 to perform diarization and/or any other audio processing, and/or the like.

Training audio data 152 may be stored in a data repository in a raw audio format, e.g., in the form of spectrograms, or in any other suitable representation characterizing speech (e.g., of a particular person). For example, a spectrogram of training audio data 152 may be obtained by recording air pressure caused by the speech as a function of time and computing a short-time Fourier transform for overlapping time intervals (frames) of a set duration. This maps the audio signal from the time domain to the frequency domain and generates a spectrogram characterizing the spectral content of training audio data 152. The amplitude of the audio signal may be represented on a logarithmic (decibel) scale. In some embodiments, the obtained spectrograms may be further converted into mel-spectrograms, by transforming frequency f into a non-linear mel domain, $f \rightarrow m = a \ln(1+f/b)$, to take into account the ability of a human car to better distinguish between equally spaced frequencies (tones) at the lower end of the frequencies of the audible spectrum than at its higher end. In one example, a=1607 and b=700 Hz. Throughout this disclosure, the term "speech spectrogram" may be understood to include Fourier spectrograms or mel-spectrograms, where applicable.

In at least one embodiment, voice detection model 122 and/or audio processing model 128 may be implemented as deep learning neural networks having multiple levels of linear or non-linear operations. For example, each or some of voice detection model 122 and/or audio processing model 128 may include convolutional neural networks, recurrent neural networks, fully-connected neural networks, long short-term memory (LSTM) neural networks, neural networks with attention, e.g., transformer neural networks, and/or the like. In at least one embodiment, one or more of voice detection model 122 and/or audio processing model 128 may include multiple neurons, an individual neuron receiving its input from other neurons and/or from an external source and producing an output by applying an activation function to the sum of (trainable) weighted inputs and a bias value. In at least one embodiment, one or more of voice detection models 122 and/or audio processing models 128 may include multiple neurons arranged in layers, including an input layer, one or more hidden layers, and/or an output layer. Neurons from adjacent layers may be connected by weighted edges. In some embodiments, training server 160 may train a number of different models, which may be models that differ by a number of neurons, number of neuron layers, specific neural architecture, and/or the like.

Training audio data 152 may be used by a training server 160 to identify parameters (e.g., neural weights, biases, parameters of activation functions, etc.) of voice detection model 122 and/or audio processing model 128 that maximize success of speaker identification, verification, and/or diarization. Training server 160 may be hosted by a desktop computer, a laptop computer, a smartphone, a tablet computer, a server, and/or any suitable computing device capable of performing the techniques described herein. In some embodiments, training of voice detection model 122 and/or audio processing model 128 may be supervised, e.g., using human-annotations of training audio data 152 with speaker identities as ground truth, or may be unsupervised, semi-supervised, and/or include reinforcement learning techniques.

Training audio data 152 may be used by training engine 162 as training input 165 to train voice detection model 122 to classify segments of training audio data as speech or non-speech (or determine probabilities that training audio data 152 includes speech). Training engine 162 may train audio processing model 128 to perform various audio processing tasks (e.g., diarization, speaker identification, speaker verification, and/or the like). In some embodiments, training engine 162 may use training embeddings (e.g., stored embeddings 154) representative of speech (and non-speech) segments of training audio data 152. In some embodiments, training engine 162 may cause execution of the audio processing pipeline (including operations of at least some of channel clustering 120, voice detection model 122, channel mixing 124, embedding clustering 126, and/or the like) to generate training embeddings for training of audio processing model 128. During training, training engine 162 may also generate mapping data 166 (e.g., metadata) that associates training inputs 165 with correct target outputs 167 (ground truth). During training of voice detection model 122 and/or audio processing model 128, training engine 162 may identify patterns in training inputs 165 based on desired target outputs 167 and train voice detection model 122 to accurately classify segments of training audio data 152 as speech or non-speech and/or train audio processing model 128 to accurately distinguish different speakers and/or attribute specific speech utterances to correct speakers.

Initially, edge weights and biases (e.g., parameters) of various network models being trained may be assigned some starting (e.g., random) values. For every training input 165, training engine 162 may cause one or more of voice detection model 122 and/or audio processing model 128 to generate output(s). Training engine 162 may then compare observed output(s) with the desired target output(s) 167. The resulting error or mismatch, e.g., the difference between the desired target output(s) 167 and the actual output(s) of the neural networks, may be back-propagated through the respective neural networks, and the weights and biases in the neural networks may be adjusted to make the actual outputs closer to the target (ground truth) outputs. This adjustment may be repeated until the output error for a given training input 165 satisfies a predetermined condition (e.g., falls below a predetermined value). Subsequently, a different training input 165 may be selected, a new output generated, and a new series of adjustments implemented, until the respective neural networks are trained to a target degree of accuracy or until the neural network(s) converges to a limit of its accuracy.

Predictive utility of the identified patterns may be subsequently verified using additional training input/target output associations. The trained voice detection model 122, audio processing model 128, and/or other models similarly trained, may then be used, during the inference stage, for processing of new (not encountered previously) input speech.

In at least one embodiment, training server 160 and audio processing server 102 may be implemented on a single computing device. Training server 160 and/or audio processing server 102 may be (and/or include) a rackmount server, a router computer, a personal computer, a laptop computer, a tablet computer, a desktop computer, a media center, or any combination thereof.

In at least some embodiments, audio processing model 128 may be trained for speaker identification, e.g., using a database of known speakers, and then applied, at inference time, for speaker verification and/or speaker diarization of speech utterances produced by new speakers. More specifically, output generated by voice detection model 122 and/or audio processing model 128 during training may be evaluated using a suitably chosen loss function that classifies the generated embeddings among a plurality of training classes (e.g., known speakers). In at least some embodiments, the loss function-based evaluation across multiple classes is performed during training but not during inference. During inference, speaker verification and speaker diarization may be performed using cosine similarity of various embeddings. In some embodiments, for efficient training, dropout techniques may be used, with outputs of at least some neurons removed (e.g., replaced with zero outputs). This forces the remaining neurons to learn how to perform classification tasks more efficiently and generate more accurate outputs. In the course of training, different neurons (e.g., randomly chosen neurons) may be dropped during processing of different batches of training data, so that all neurons learn to perform tasks more accurately and efficiently.

Figure 1B:
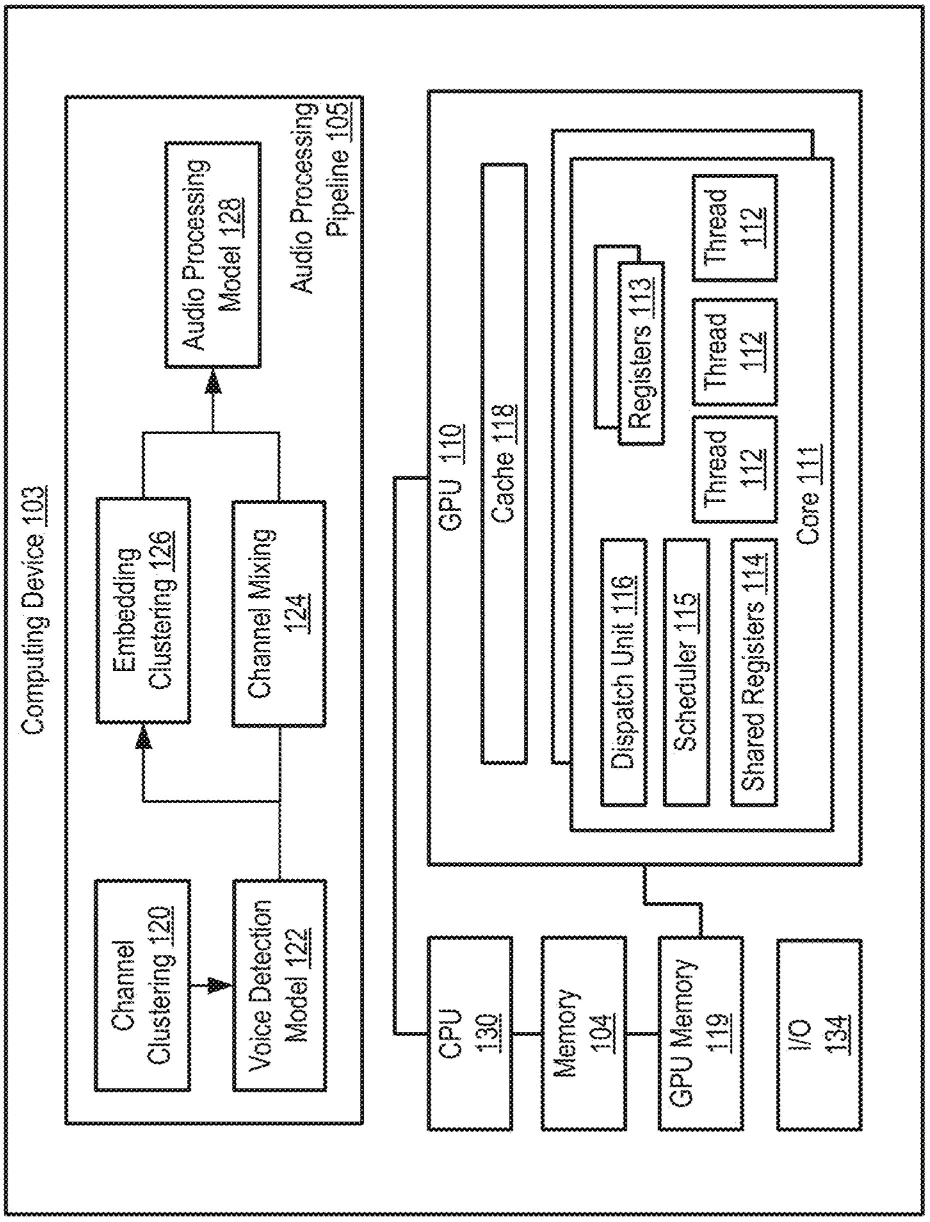
FIG. 1B illustrates an example computing device that supports training or deployment of an audio processing pipeline capable of performing efficient multi-channel multi-speaker identification, verification, and/or diarization, according to at least one embodiment.

FIG. 1B illustrates an example computing device 103 that supports training or deployment of an audio processing pipeline capable of performing efficient multi-channel multi-speaker identification, verification, and/or diarization, according to at least one embodiment. In at least one embodiment, computing device 103 may be a part of audio processing server 102. In at least one embodiment, computing device 103 may be a part of training server 160. In at least one embodiment, computing device 103 supports an audio processing pipeline 105 that includes (but need not be limited to) channel clustering 120, voice detection model 122, channel mixing 124, embedding clustering 126, and audio processing model 128. Operations of audio processing pipeline 105 may be executed using one or more GPUs 110, one or more CPUs 130, one or more parallel processing units (PPUs) or accelerators, such as a deep learning accelerator, data processing units (DPUs), and/or the like. In at least one embodiment, a GPU 110 includes multiple cores 111, each core being capable of executing multiple threads 112. Each core may run multiple threads 112 concurrently (e.g., in parallel). In at least one embodiment, threads 112 may have access to registers 113. Registers 113 may be thread-specific registers with access to a register restricted to a respective thread. Additionally, shared registers 114 may be accessed by one or more (e.g., all) threads of the core. In at least one embodiment, each core 111 may include a scheduler 115 to distribute computational tasks and processes among different threads 112 of core 111. A dispatch unit 116 may implement scheduled tasks on appropriate threads using correct private registers 113 and shared registers 114. Computing device 103 may include input/output component(s) 134 to facilitate exchange of information with one or more users or developers.

In at least one embodiment, GPU 110 may have a (high-speed) cache 118, access to which may be shared by multiple cores 111. Furthermore, computing device 103 may include a GPU memory 119 where GPU 110 may store intermediate and/or final results (outputs) of various computations performed by GPU 110. After completion of a particular task, GPU 110 (or CPU 130) may move the output to (main) memory 104. In at least one embodiment, CPU 130 may execute processes that involve serial computational tasks whereas GPU 110 may execute tasks (such as multiplication of inputs of a neural node by weights and adding biases) that are amenable to parallel processing. In at least one embodiment, audio processing pipeline 105 may determine which processes are to be executed on GPU 110 and which processes are to be executed on CPU 130. In other embodiments, CPU 130 may determine which processes are to be executed on GPU 110 and which processes are to be executed on CPU 130.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems for generating or presenting at least one of augmented reality content, virtual reality content, mixed reality content, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implementing one or more language models, such as large language models (LLMs) (which may process text, voice, image, and/or other data types to generate outputs in one or more formats), systems implemented at least partially using cloud computing resources, systems for performing generative AI operations, and/or other types of systems.

Audio Processing Pipeline

Figure 2:
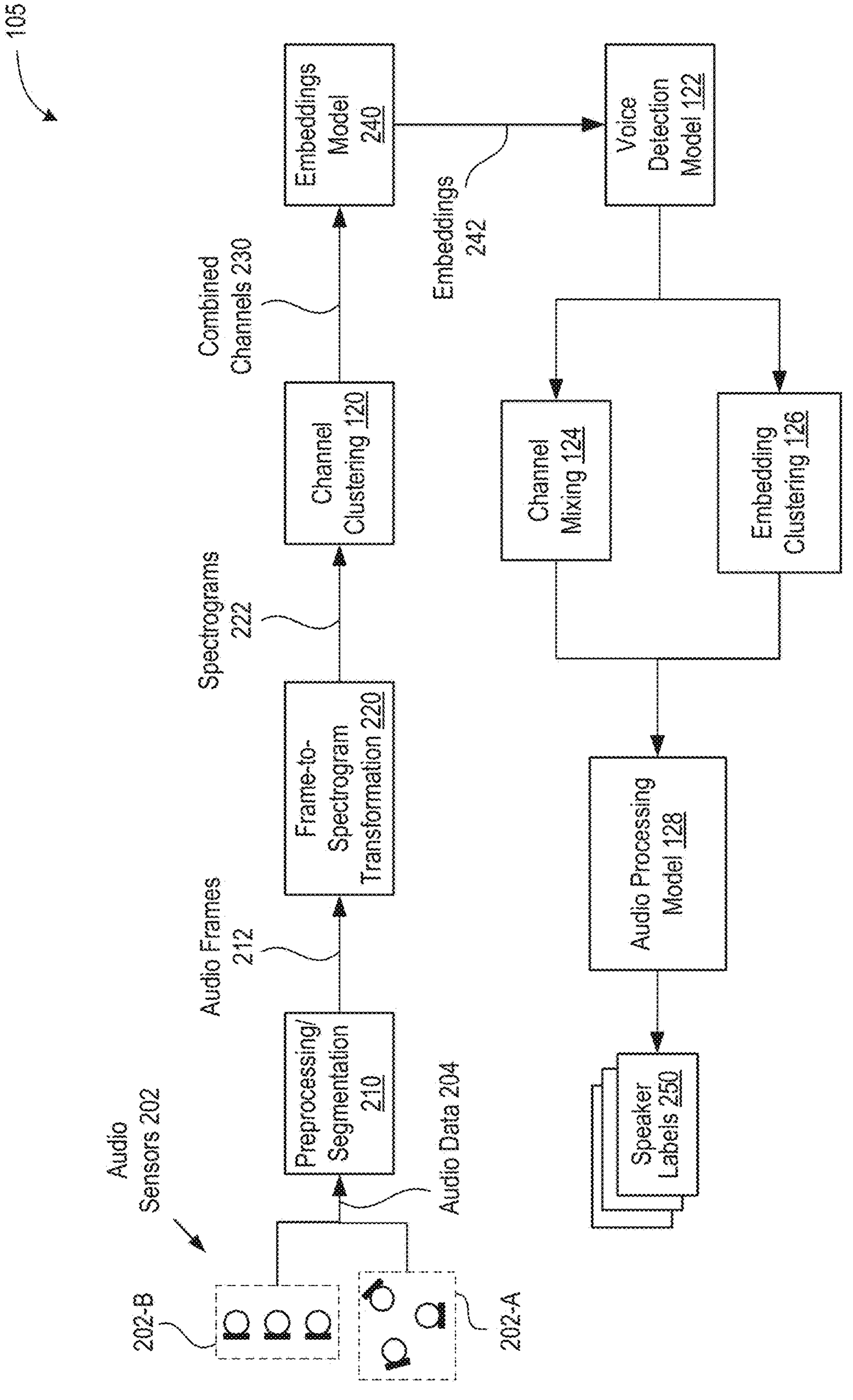
FIG. 2 illustrates an example architecture and data flow of an audio processing pipeline capable of performing efficient multi-channel multi-speaker identification, verification, and/or diarization, according to at least one embodiment.

FIG. 2 illustrates an example architecture and data flow of an audio processing pipeline 105 capable of performing efficient multi-channel multi-speaker identification, verification, and/or diarization, according to at least one embodiment. In at least one embodiment, audio processing pipeline 105 may be implemented using audio processing server 102, which may be located on a single computing device or on multiple computing devices. Various blocks in FIG. 2 denoted with the same numerals as the respective blocks of FIG. 1A and/or FIG. 1B may implement the same (or a similar) functionality.

As illustrated in FIG. 2, audio processing pipeline 105 may receive audio data captured by multiple audio sensors 202, e.g., microphones. Audio sensors 202 may include distributed microphones 202-A and arrays of microphones 202-B, which may be arranged into any spatial pattern, e.g., a linear pattern, a circular (arc) pattern, a two-dimensional pattern (e.g., microphones placed on desks of a conference hall), a three-dimensional pattern (e.g., microphones placed at different heights of the conference hall), and/or the like. Microphones can include dynamic microphones, condenser microphones, ribbon microphones, unidirectional microphones, omnidirectional microphones, and/or any other types of microphones. In some embodiments, a microphone can be combined with other devices, e.g., computers, phones, speakers, TV screens, and/or the like. The audio data 204 collected by audio sensors 202 may be generated, e.g., spoken, by a single speaker or multiple speakers and may include a single speech episode or multiple speech episodes. The speaker(s) may be moving (e.g., while talking) across any appropriate space, which may include one or multiple rooms or outdoor spaces. Audio sensors 202 may capture not only a speech signal but also background noise, interference signals, e.g., emitted by TV devices, radio devices, alarm devices, and/or any other equipment, or sounds naturally occurring (e.g., sound of wind, water, birds, etc.). Depending on a relative distance (and/or orientation) of an individual speaker to various audio sensors 202, speech produced by the individual speaker can be captured more (or less) clearly by some of the audio sensors 202 with the relative arrangement of speakers and audio sensors 202 changing with time. Any number of speakers can be active individually or simultaneously, carrying out multiple conversations at the same time.

Audio data 204 collected by audio sensors 202 may undergo speech preprocessing and segmentation 210. For example, preprocessing may include audio filtering, denoising, amplification, dereverberation, and/or any other suitable enhancement. Preprocessing may further include removal of portions of the audio data 204 that do not have a speech content. For example, preprocessing may evaluate energy e(t) associated with the audio data as a function of time and identify regions that have energy less than a certain threshold (e.g., an empirically determined noise threshold). Such identified regions may be removed (trimmed) from the audio data 204 during speech preprocessing. Segmentation may include segmenting the audio data 204 into intervals of a predetermined sizes (durations), $\tau$, e.g., 0.5-5 sec. Such intervals are sometimes referred to as utterances herein. It should be understood that utterances need not correspond to a complete logical unit of speech and may encompass one or more sentences, one or more words, a part of a word, one or more exclamations, filler words, pauses, and/or the like. In some embodiments, the utterances (intervals) may be partially overlapping.

Individual utterances may be represented by a plurality of frames, e.g., T frames over a certain predetermined interval of time. Frames may have a duration of 15 msec, 20 msec, 30 msec, and/or some other duration. Frames may undergo a suitable frame-to-spectrogram transformation 220. For example, a spectrogram of a frame may be obtained or generated by performing the discrete Fourier transform of acoustic energy e(t) or air pressure p(t) associated with a specific utterance. The obtained spectrograms $e(f_j)$ may be defined for a number of bands $f_1, f_2 \ldots f_c$, for example, for C=80 bands or C=128 bands, or any other number of bands. In some embodiments, the bands may be mel-bands and the spectrograms may be mel-spectrograms. Separate spectrograms 222 may be obtained for separate audio frames 212.

In some embodiments, operations of preprocessing and segmentation 210 and frame-to-spectrogram transformation 220 may be performed separately for separate channels. For example, $N_0$ microphones of audio sensors 202 may generate the equal number $N_0$ of streams (channels) of audio data 204. Correspondingly, a separate audio frame 212 and a separate spectrogram 222 may be generated for separate channels for any given time.

In some embodiments, spectrograms 222 may be used to perform channel clustering 120. More specifically, a set of one or more (e.g., n) spectrograms 222 associated with a particular timestamp $t_0$ may be selected for a given channel. In some embodiments, the number n may be large enough for the spectrograms to cover an interval of audio that is sufficiently long to include one or more complete words, e.g., 0.5-5 sec, though the interval may be shorter than 0.5 sec or longer than 5 sec, in some embodiments. Channel clustering 120 may include evaluating acoustic similarity of $N_0$ of such sets, e.g., by computing an $N_0 \times N_0$ acoustic similarity matrix (coherence matrix) S, although referred to as similarity matrix herein, for brevity. An element $S_{jk}$ of the similarity matrix S may characterize a similarity between the spectrograms of channel j and spectrograms of channel k. Matrix S may be constructed by computing expectation values $\xi\{e_j(f)e_k(f)\}$ for the spectrograms e(f) of the acoustic energy e(t). For example, the expectation values may be computed as the sum, $$\varepsilon\{e_j(f)e_k^*(f)\} = \frac{1}{C}\sum_i e_j(f_i)e_k^*(f_i),$$

over C individual frequencies $f_i$ of the spectrograms, e.g., if the expectation values are computed for individual spectrograms. In those instances where similarities of sets of n spectrograms are being determined, n sums over the set $\{f_i\}$ of frequencies for the pairs of spectrograms corresponding to the same timestamps may be computed. The elements of the similarity matrix may then be computed as follows, $$S_{jk} = \frac{\varepsilon\{e_j(f)e_k^*(f_i)\}}{\sqrt{\varepsilon\{|e_j(f)|^2\}\varepsilon\{|e_k(f)|^2\}}}.$$

Although in the above example, the expectation values and the elements of the similarity matrix are computed in the frequency domain, in some embodiments, the similarity matrix may be computed directly in the time domain for the acoustic energy e(t), e.g., $$S_{jk} = \frac{\varepsilon\{e_j(t)e_k^*(t)\}}{\sqrt{\varepsilon\{|e_j(t)|^2\}\varepsilon\{|e_k(t)|^2\}}},$$

where $$\varepsilon\{e_j(t)e_k^*(t)\} = \frac{1}{n}\sum_i e_j(t_i)e_k^*(t_i).$$

The form of the similarity matrix S indicates a degree to which individual channels are correlated with or independent of other channels. For example, in a situation where each channel captures a portion of the total audio environment that does not correlate with other portions (e.g., where individual microphones capture speech of a different speaker or different groups of speakers not captured by other microphones), the similarity matrix is equal (or approximately equal, given the noise present in the environments) to the identity matrix. In a situation where all microphones capture the same speech (e.g., a presentation by a plenary speaker), all elements of the similarity matrix S have the same (or approximately the same, given the noise) values (e.g., one). In a situation where groups of microphones capture similar audio content that is different from audio content captured by other groups, the similarity matrix S may have a block structure and may include blocks of (though not necessarily contiguous) matrix elements $S_{jk}$ characterizing intra-block similarities than matrix elements describing similarities between different blocks (inter-block similarities.)

Figures 3A, 3B:
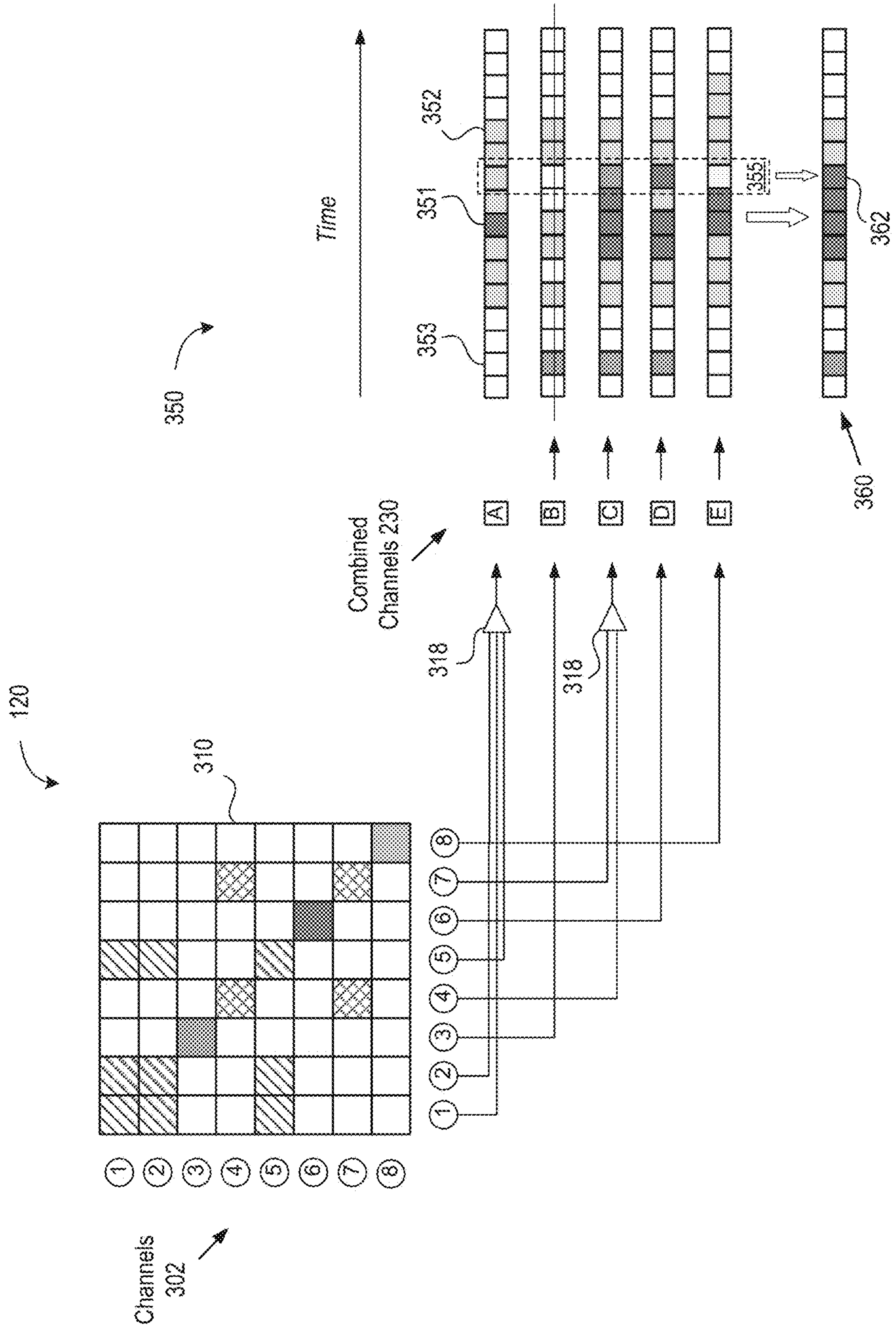
FIG. 3A illustrates example operations of channel clustering that can be performed as part of the audio processing pipeline, according to at least one embodiment.
FIG. 3B illustrates an example output of channel mixing deployed as part of audio processing pipeline, according to at least one embodiment.

FIG. 3A illustrates example operations of channel clustering 120 that can be performed as part of audio processing pipeline 105, according to at least one embodiment. FIG. 3A depicts a similarity matrix 310 for an example non-limiting situation where $N_0$=8 channels 302, numbered with circled numerals 1 . . . 8, have a certain physical arrangement in an audio environment where microphones associated with channels 1, 2, and 5 capturing substantially similar audio content, microphones associated with channels 4 and 7 similarly capturing a different audio content, and each of the remaining channels 3, 6, and 8 having distinct audio content that is dissimilar to the audio content captured by all other microphones. Shaded squares of similarity matrix 310 indicate elements $S_{jk}$ that are substantially larger than the elements indicated with white squares. In particular, matrix elements $S_{11}$, $S_{12}$, $S_{15}$, $S_{21}$, $S_{22}$, $S_{25}$, $S_{51}$, $S_{52}$, and $S_{55}$ correspond to the first group of channels. Groups of channels capturing substantially similar audio content may be combined into a (dynamically determined) number N of combined channels 230 ($N \le N_0$) with individual combined channels 230 capturing distinct audio content not captured by other combined channels. In particular, in the illustrative example of FIG. 3A, channels 1, 2, and 5 may be combined (clustered) into a combined channel (channel cluster) A (combined channels are indicated schematically with boxed letters), channels 4 and 7 may be combined into combined channel C, and each of channels 3, 6, and 8 may be assigned to single-channel clusters B, D, and E, respectively. Clustering of channels may be performed using any suitable operation 318 of aggregation or pooling. In one example, combining channels 1, 2, and 5 may be performed by averaging of the spectrograms of the respective channels, $$e_A(f) = \frac{1}{3}[e_1(f) + e_2(f) + e_5(f)].$$

Alternatively, averaging may be performed in the time domain, $$e_A(t) = \frac{1}{3}[e_1(t) + e_2(t) + e_5(t)].$$

In another example, operation 318 of combining channels 1, 2, and 5 may be performed by taking the maximum of the spectrograms of the respective channels, $$e_A(f) = \max[e_1(f), e_2(f), e_5(f)].$$

Alternatively, maximums may be taken in the time domain, $e_A(t)=\max[e_1(t), e_2(t), e_5(t)]$. In some embodiments, aggregation of channels may be performed using weighted averaging of individual channels, e.g., with weights determined based on signal-to-noise ratio (SNR) of signals received via respective channels (with channels having higher SNR values given larger weights). In some embodiments, a suitable filtering operation may first be applied to the spectrograms/time domain values associated with various channels followed by a suitable aggregation operation.

In some embodiments, channel clustering 120 can be performed by a trained machine learning model, e.g., a neural network-based model. An input into such a channel clustering model may include a set of spectrograms for the energy (or pressure) $\{e_j(f)\}$ or a set of energy (or pressure) values in the time domain $\{e_j(t)\}$ for each of the channels. In some embodiments, prior to inputting the sets of audio data (e.g., $\{e_j(f)\}$ or $\{e_j(t)\}$) into the channel clustering model, the audio data can first be converted into embeddings, e.g., using wav2vec converted or any other suitable audio-to-embeddings converter. The output of the channel clustering model may include a table of probabilities Pix indicating a likelihood that the j-th channel captured the same audio content as did the k-th channel or some other indications of similarities of the audio content of different channels. The channel clustering model may be trained, e.g., by randomly sampling from training audio data 152 (of FIG. 1A) and using a suitable loss function (e.g., binary cross-entropy loss function or some other loss function) to determine parameters of the channel clustering model that ensure correct determination of the channel audio data similarity.

Referring again to FIG. 2, the N combined channels 230 may be processed by a suitable embeddings model 240 that applies a sliding window to the channel audio data (which may but need not be the same sets of n spectrograms or frames as used in channel clustering). Embeddings model 240 represents the audio data in the sliding window via embeddings 242 (feature vectors) that capture audio features of the audio data, e.g., spectral features, cadence, volume, and/or the like. An embedding should be understood as any suitable digital representation of an input data, e.g., as a vector (string) of any number D of components, which can have integer values or floating-point values. Embeddings 242 can be considered as vectors or points in a D-dimensional embedding space. The dimensionality D of the embedding space (defined as part of embeddings model 240 architecture) can be smaller than the size of the input data (the sets of audio spectrograms or frames). During training, embeddings model 240 learns to associate similar sets of training audio spectrograms/frames with similar embeddings represented by points closely situated in the embedding space and further learns to associate dissimilar sets of training audio spectrograms/frames with points that are located further apart in the embedding space. In some embodiments, a separate sound embedding (or a separate set of sound embeddings) can represent a given audio spectrograms/frame or a set of predetermined number of audio spectrograms/frames.

In some embodiments, prior to processing combined channels 230 using the embedding model 240, combined channels 230 may undergo additional preprocessing, including but not limited to filtering, denoising, amplification, dereverberation, and/or some other suitable enhancement or a combination thereof.

In some embodiments, e.g., as described above in conjunction with the channel clustering model, embeddings model 240 can be applied to spectrograms 222 prior to channel clustering 120 with channel clustering 120 generating combined (e.g., aggregated) embeddings that represent audio content of the combined channels.

Embeddings 242 generated by embeddings model 240 (or channel clustering 120) may be processed by voice detection model 122 that determines, for individual embeddings, a likelihood that the respective embeddings are associated with speech (rather than with noise or non-speech sounds). In some embodiments, such likelihoods may be characterized via probabilities w that are defined on the interval of values [0, 1]. In some embodiments, the likelihoods may be characterized via logits $$L = \mathrm{Log}\left[\frac{w}{1-w}\right],$$

that are defined on the interval $(-\infty, \infty)$ with strongly positive logits $L \gg 1$ corresponding to high likelihoods ($w \approx 1$) that the respective embedding is associated with an interval of time containing a spoken speech and strongly negative logits L corresponding to low likelihoods ($w \approx 0$) of speech and/or high likelihoods of noise. Positive or negative logits L having values around zero characterize embeddings that correspond to intervals where speech cannot be distinguished from noise with much certainty.

Following application of voice detection model 122, audio processing pipeline 105 may continue with one or more branches of processing. In some embodiments, an upper branch (channel mixing 124) may be deployed. In other embodiments, a bottom branch (embedding clustering 126) may be deployed. In yet other embodiments, both the upper branch and the bottom branch may be used.

In one embodiment that deploys channel mixing 124, distinct channels characterized by low logit values may be discarded. FIG. 3B illustrates an example output 350 of channel mixing 124 deployed as part of audio processing pipeline 105, according to at least one embodiment. Individual embeddings associated with different channels are indicated with squares with the degree of shading indicating a likelihood of speech associated with respective embeddings. For example, as illustrated for embeddings of the combined channel A, embedding 351 corresponds to a segment of speech having a high likelihood of representing speech (and a low likelihood of representing noise), embedding 352 corresponds to a segment of speech having a medium likelihood of representing speech (and a medium likelihood of representing noise), and embedding 353 corresponds to a segment of speech having a low likelihood of representing speech (and a high likelihood of representing noise).

In some embodiments, a channel that includes embeddings having a low likelihood of representing speech—e.g., the combined channel B in FIG. 3B—may be discarded (as illustrated with the strikethrough across the embeddings). In some embodiments, a decision whether to discard a given combined channel may be performed individually for groups of n embeddings (e.g., n=16 in FIG. 3B). Such a decision may be based on values of n individual logits, e.g., an arithmetic or geometric mean of the individual logits. For example, if an average (or otherwise aggregated) $L_{AV}$ value characterizing n individual logits $L_1 \ldots L_n$ is below a certain minimum value $L_{MIN}$ (e.g., zero value, or any other positive and/or negative empirically predetermined value), the embeddings of the corresponding combined channel may be discarded.

The embeddings of the remaining combined channels may be aggregated into mixed embeddings. For example, embeddings of channels A, C, D, and E in FIG. 3B may be aggregated into mixed embeddings 360. Aggregation/mixing may be performed separately for embeddings associated with individual timestamps. For example, as illustrated in FIG. 3B, embeddings inside box a 355 (with the exception of the embedding of the eliminated vector B), which correspond to the same timestamp, may be aggregated into a mixed embedding 362. In some embodiments, the aggregation may be performed by selecting an embedding characterized by the highest likelihood (e.g., logit value) of having speech content. For example, as depicted, the embedding belonging to channel D may have the highest logit value among the embeddings of box 355 and may, therefore, be selected as mixed embedding 362. In some embodiments, embeddings from the remaining channels that have not been eliminated (e.g., from channels with $L_{AV} \geq L_{MIN}$) may be aggregated by computing a sum of the embeddings weighted with some suitable weights. For example, in one embodiment, $$EMB_{MIX}(\tau) = \sum_{C} \frac{1}{1 + e^{-L_C(\tau)}} \times EMB_C(\tau),$$

where the sum is taken over all (uneliminated) channels C, $\tau$ denotes a particular timestamp, $EMB_C(\tau)$ stands for embedding of channel C corresponding to this timestamp $\tau$, $L_C(\tau)$ is a logit value for the respective channel, and $EMB_{MIX}(\tau)$ is the embedding for the mixed channel at timestamp $\tau$.

Referring again to FIG. 2, the mixed embeddings may then be processed by audio processing model 128 trained to perform one or more of a speaker identification, speaker verification, diarization, and/or the like. In some embodiments, audio processing model 128 identifies speaker labels 250 associating specific temporal intervals of audio data 204 with respective speakers that produced speech of those temporal intervals.

In one embodiment, embedding clustering 126 may be performed to analyze a distribution of embeddings of distinct channels in the embeddings space (e.g., a D-dimensional space of all possible embeddings). Embedding clustering 126 may be performed to eliminate outlier embeddings and keep embeddings that are more similar to each other. Such embeddings can be expected to be representative of actual audio content, as opposed to representing random noise features that have little correlation across different channels. In some embodiments, embedding clustering 126 may use embeddings of N combined channels 230 as an input. In some embodiments, the number of channels may first be reduced further, $N \rightarrow \tilde{N}$, e.g., by discarding channels whose embeddings are determined, e.g., by voice detection model 122 (e.g., as disclosed above), to represent audio content that contains speech with a low likelihood (e.g., below a minimum predetermined probability).

Embedding clustering 126 may determine a centroid embedding for N (or $\tilde{N}$) embeddings in the D-dimensional embeddings space and may further compute distances from individual embeddings to the centroid embedding. For example, the centroid embedding can be obtained by averaging N (or N) embeddings. The distances may be Euclidean distances in the embeddings space. Embedding clustering 126 may then select a predetermined number K of embeddings with the lowest distances from the centroid embedding while eliminating N−K (or $\tilde{N}$−K) embeddings with longer distances from the centroid embedding. In some embodiments, the number K of aggregated embeddings may be determined by an architecture of audio processing model 128. For example, if audio processing model 128 has an input layer of neurons with 768 different input channels and individual embeddings are 192-bit long, K=4 embeddings may be aggregated at embedding clustering 126. The K remaining embeddings may then be aggregated (e.g., concatenated), and the aggregated embeddings may be processed by audio processing model 128 that performs speaker identification, speaker verification, diarization, and/or the like. In some embodiments, audio processing model 128 identifies speaker labels 250 associating specific temporal intervals of audio data 204 with respective speakers that produced speech of those temporal intervals.

Figure 3C:
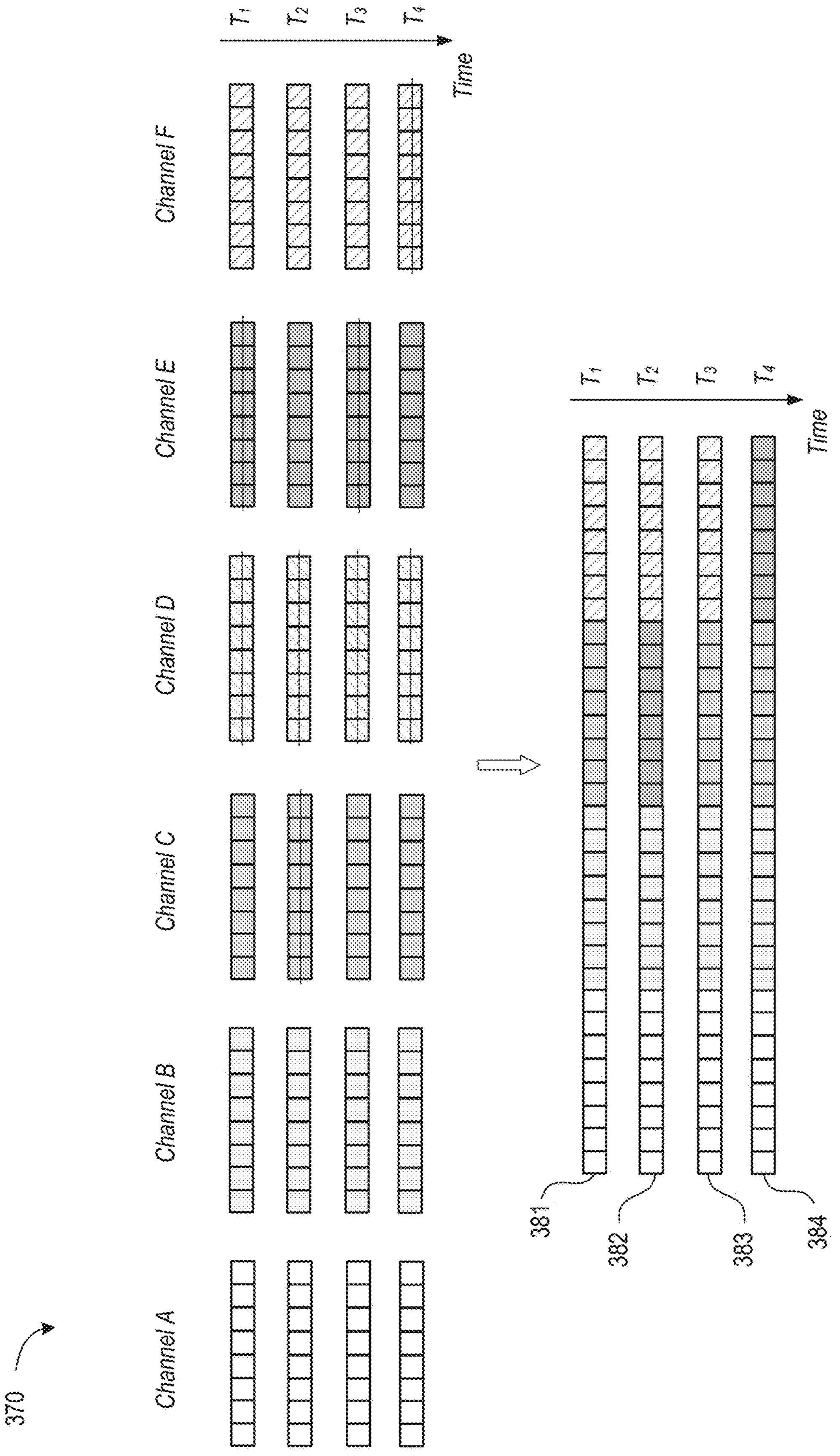
FIG. 3C illustrates example operations of embedding clustering deployed as part of the audio processing pipeline, according to at least one embodiment.

FIG. 3C illustrates example operations 370 of embedding clustering 126 deployed as part of audio processing pipeline 105, according to at least one embodiment. FIG. 3C illustrates a non-limiting example of N=6 channels, each channel associated with a corresponding embedding (embeddings of different channels are marked with different shadings). Embedding clustering 126 reduces N=6 embedding to K=4 most similar embeddings, for each of the four illustrated timestamps $T_1 \ldots T_4$. For example, for the first timestamp $T_1$, embeddings of channels D and E are discarded while embeddings of channels A, B, C, and F are combined into an aggregated (e.g., concatenated) embedding 381. Similarly, for the fourth timestamp $T_4$, embeddings of channels D and F are discarded while embeddings of channels A, B, C, and E are combined into an aggregated embedding 384.

Figure 4A:
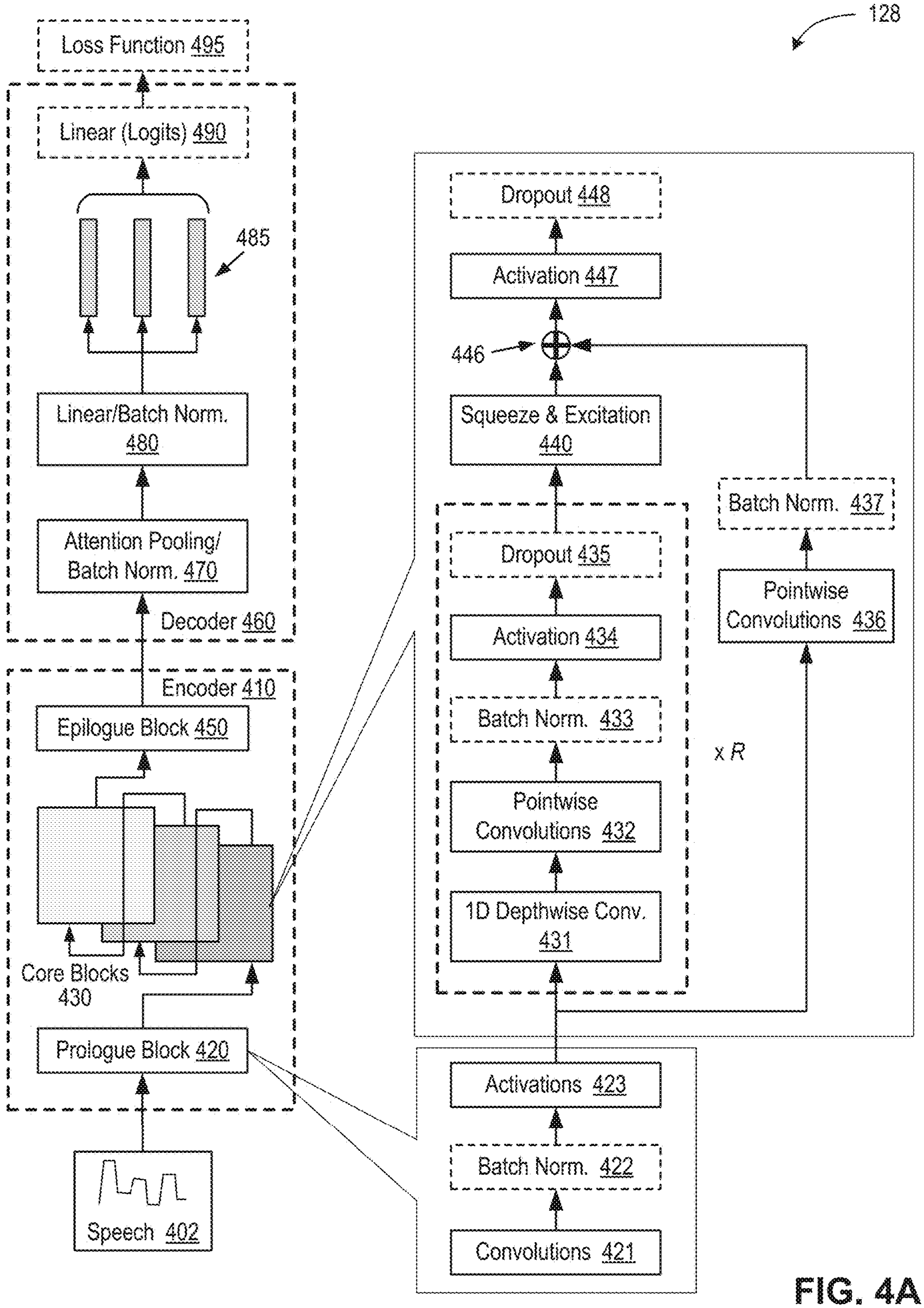
FIG. 4A illustrates an example architecture of an audio processing model that can be used for efficient multi-channel multi-speaker identification, verification, and diarization, according to at least one embodiment.

FIG. 4A illustrates an example architecture of audio processing model 128 that can be used for efficient multi-channel multi-speaker identification, verification, and diarization, according to at least one embodiment. Audio processing model 128 may include a neural network that generates speaker embeddings for characterization of speech spoken at various time intervals. In some embodiments, audio processing model 128 may be configured to process speech 402. Speech 402 may include embeddings produced using channel mixing 124 (e.g., as illustrated in FIG. 3A and FIG. 3B), embeddings produced using embedding clustering 126 (e.g., as illustrated in conjunction with FIG. 3C), and/or using some other suitable techniques. As illustrated in FIG. 4A, audio processing model 128 may include an encoder stage 410 and a decoder stage 460. Encoder stage 410 may include a number of blocks configured to combine local (temporal) context of speech features with global context of each internal (utterance) of speech 402. As illustrated in FIG. 4A, encoder stage 410 may include a prologue block 420, one or more core blocks 430, and an epilogue block 450. Individual blocks of blocks 420-450 may include one or more convolutions. For example, as illustrated with the bottom callout portion in FIG. 4A, prologue block 420 may include a layer of convolutions 421, a batch normalization layer 422, and/or a layer of activations 423. In some embodiments, layer of convolutions 421 may deploy filters (kernels) of a suitable size, e.g., size 3, 5, etc., which may be used for depthwise convolutions, pointwise convolution, or a combination of depthwise and pointwise convolutions. In at least some embodiments, epilogue block 450 may have a similar composition to the prologue block 420, with the same or a different filter size (e.g., 1, 3, etc.).

Figure 4C:
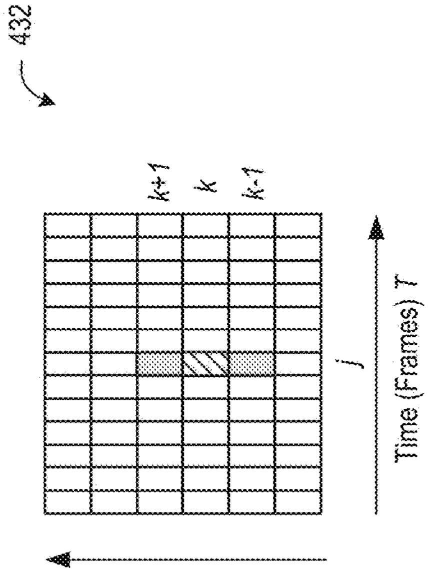
FIG. 4C illustrates a pointwise convolutional filter, according to at least one embodiment.
Figure 4B:
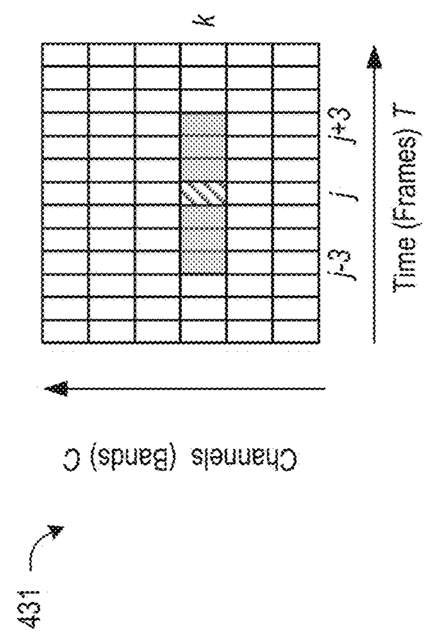
FIG. 4B illustrates application of a depthwise convolutional filter, according to at least one embodiment.

One example structure of core blocks 430 is illustrated in the top callout portion of FIG. 4A. Each core block may include a block of separable time-channel (T-C) convolutions. For example, a separable T-C convolution may include a layer of one-dimensional (1D) depthwise convolutions 431 performed across multiple times (frames) and fixed channels (e.g., mel-bands). FIG. 4B illustrates a depthwise convolutional filter 7×1 applied to elements (j−3, k) through (j+3, k), according to at least one embodiment. Separable T-C convolutions may further include a layer of pointwise convolutions 432 performed across multiple channels and fixed time frames. Pointwise convolutions 432 may be 1×1 convolutions used to create linear combinations of the outputs of depthwise convolutions 431. FIG. 4C illustrates a pointwise convolutional filter 1×3 applied to elements (j, k−1) through (j, k+1), according to at least one embodiment. Separable T-C convolutions may have stride 1 and dilation 1 or some other suitable stride and dilation. Separable T-C convolutions may be followed by a batch normalization layer 433 and a layer of activations 434. With a continuing reference to FIG. 4A, blocks of layers 431-434 may be implemented multiple (R) times within each core block 430. By changing the number R of blocks of layers, the total depth of audio processing model 128 may be varied. The width of audio processing model 128 may also be varied, e.g., increased or decreased, by varying filter sizes of each core block 430.

The repeated blocks of layers 431-434 may be connected to a squeeze-and-excitation (SE) group 440 whose example structure is illustrated in more detail below in conjunction with FIG. 4D. SE group 440 implements global pooling for context inclusion. The output of the first branch, which includes blocks of layers 431-434 and SE group 440, may be combined with an output of the second branch. The second branch (a skip connection, residual connection, etc.) may include one or more additional layers of pointwise convolutions 436 and a batch normalization layer 437. In some embodiments, combining the two outputs may be performed by average element-wise pooling 446. The combined output may be additionally processed by a layer of activations 447. As a result of operations of encoder stage 410, the channel dimension may change, e.g., from C=80 to C=256, 512, 1024, and so on. The number of repeated blocks may be R=2, 3, 4, or some other number. Filter (kernel) sizes deployed by various convolutions of encoder stage 410 may be 3, 7, 11, 15, or any other suitable size.

Features output by encoder stage 410 may be processed using decoder stage 460. More specifically, an attention pooling layer 470 (which may include a batch normalization operation) may collapse features of size $\tilde{C}\times\tilde{T}$ across the time dimension, $\tilde{C}\times\tilde{T}\rightarrow\tilde{C}\times 1$, to obtain intermediate features. In one example embodiment, C=3072. The intermediate features may be processed by a linear layer 480 (which, during training, may also include a batch normalization operation) that applies a convolutional filter to modify (e.g., reduce) the channel dimension $\tilde{C}\rightarrow d$ to obtain speaker embeddings 485 for various utterances in the batch. In one example embodiment, d=192. The described architecture of audio processing model 128 allows for obtaining fixed-size speaker embeddings from variable-duration speech utterances. A linear layer 490 may generate logits that determine probabilities of speaker embeddings 485 belonging to one of N classes (e.g., N speakers in the training database). During training, the linear layer 490 may feed logits into a suitable loss function 495.

In some embodiments, some of the blocks of FIG. 4A may be performed under some conditions and not performed under other conditions. For example, as indicated with the dashed outlines of the corresponding blocks, linear (logits) layer 490 and loss function 495 may be used during speaker identification training, but not used during speaker verification and/or diarization inference. More specifically, audio processing model 128 may be trained for speaker identification (e.g., using speaker ground truth) and may be deployed, during inference, for speaker verification and/or speaker diarization. In such embodiments, speaker verification and/or diarization inference may be performed directly based on speaker embeddings 485, without linear (logits) layer 490 and loss function 495.

In some embodiments, as similarly indicated with dashed outlines of the corresponding boxes, batch normalization layers 433 are deployed during training (e.g., when batches of multiple training utterances are used) but not during inference (e.g., when various utterances of speech 402 are processed individually). In some embodiments, dropout operations 435 and/or 448 may additionally be used during training. Dropout operations may involve removing at least some neurons from one or more neuron layers and replacing them with fixed outputs, e.g., zero outputs. The use of dropout techniques forces the remaining neurons to learn how to perform classification tasks more efficiently. During different training epochs, different sets of neurons (e.g., randomly chosen neurons) may be dropped.

Figure 4D:
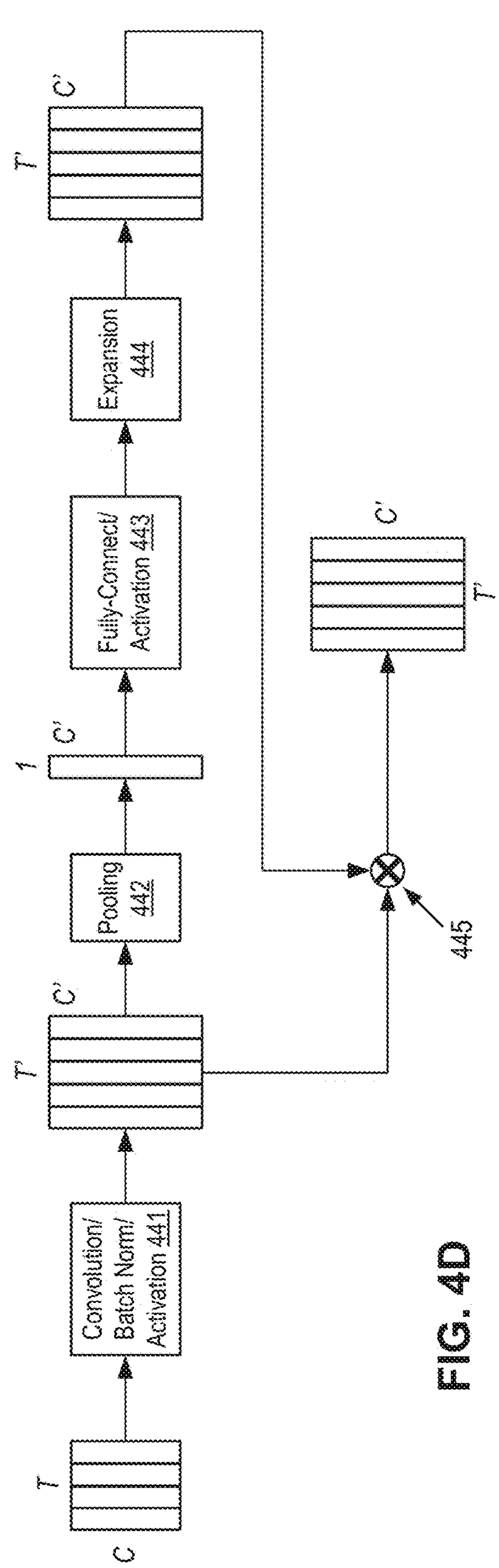
FIG. 4D illustrates schematically a structure of a squeeze-and-excitation block of FIG. 4A, according to at least one embodiment.

FIG. 4D illustrates schematically a structure of SE group 440 of FIG. 4A, according to at least one embodiment. A size of an input into SE group 440 is shown to be C×T although it should be understood that the number of channels C and the number of times T may change in the course of processing by blocks of layers 431-434. SE group 440 may include one or more convolutional layers followed by batch normalization layers and activation layers (shown as group 441), which may further change the number of channels/times, $C\times T\rightarrow C'\times T'$. SE group 440 may include a pooling layer 442, e.g., an average pooling layer, that squeezes the data across various time channels, $C'\times T'\rightarrow C'\times 1$. The squeezed data may undergo processing by one, two, or more fully connected layers and may be additionally processed by one or more layers of activations (shown as group 443). The data may undergo expansion 444 across the temporal dimension, $C'\times 1\rightarrow C'\times T'$, followed by combining the data with a copy of the data input into pooling layer 442. In some embodiments, combining the data may be performed using element-by-element multiplication 445.

Figure 5:
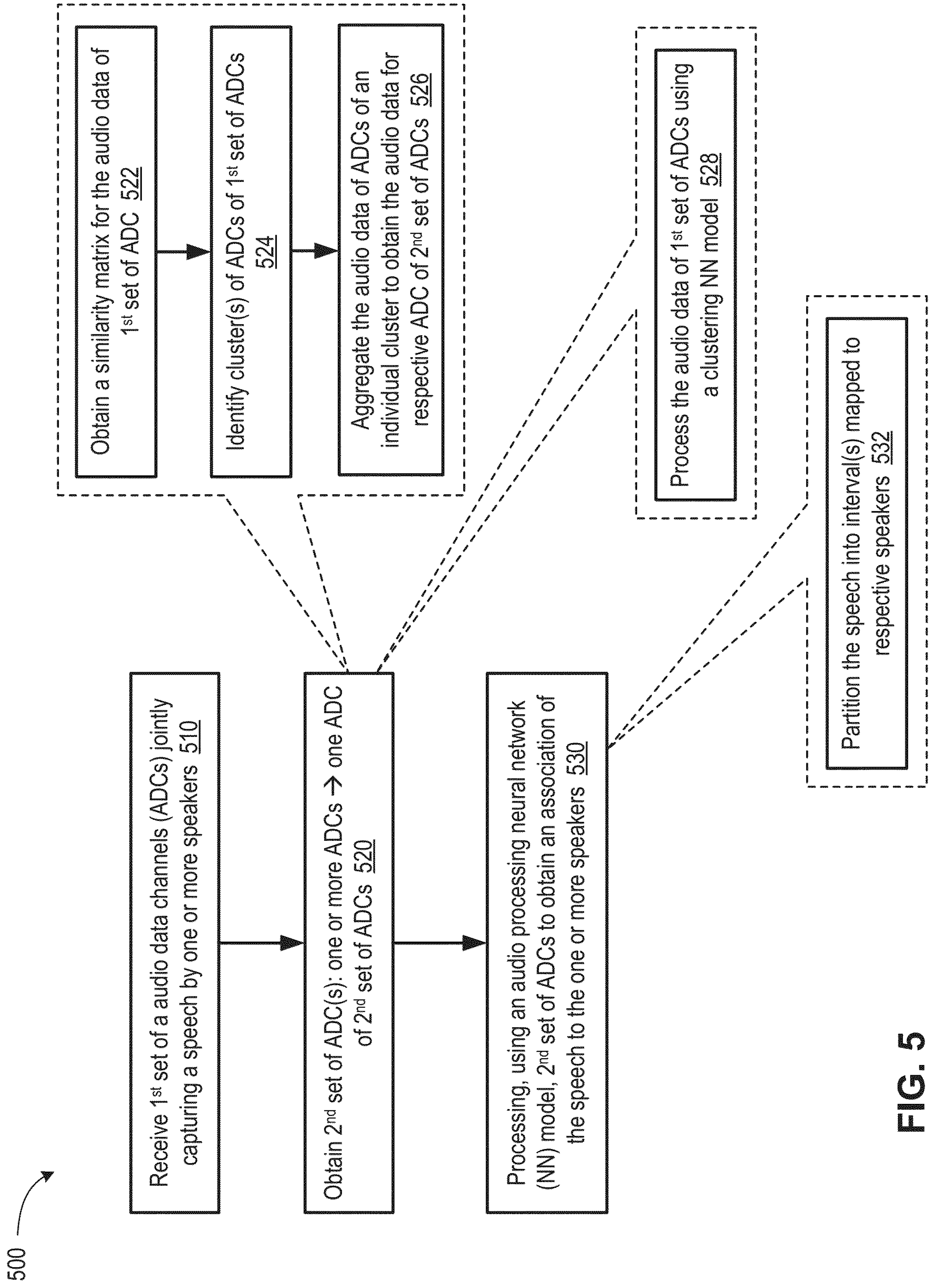
FIG. 5 is a flow diagram of an example method of efficient multi-channel multi-speaker identification, verification, and/or diarization, according to at least one embodiment.
Figure 6A:
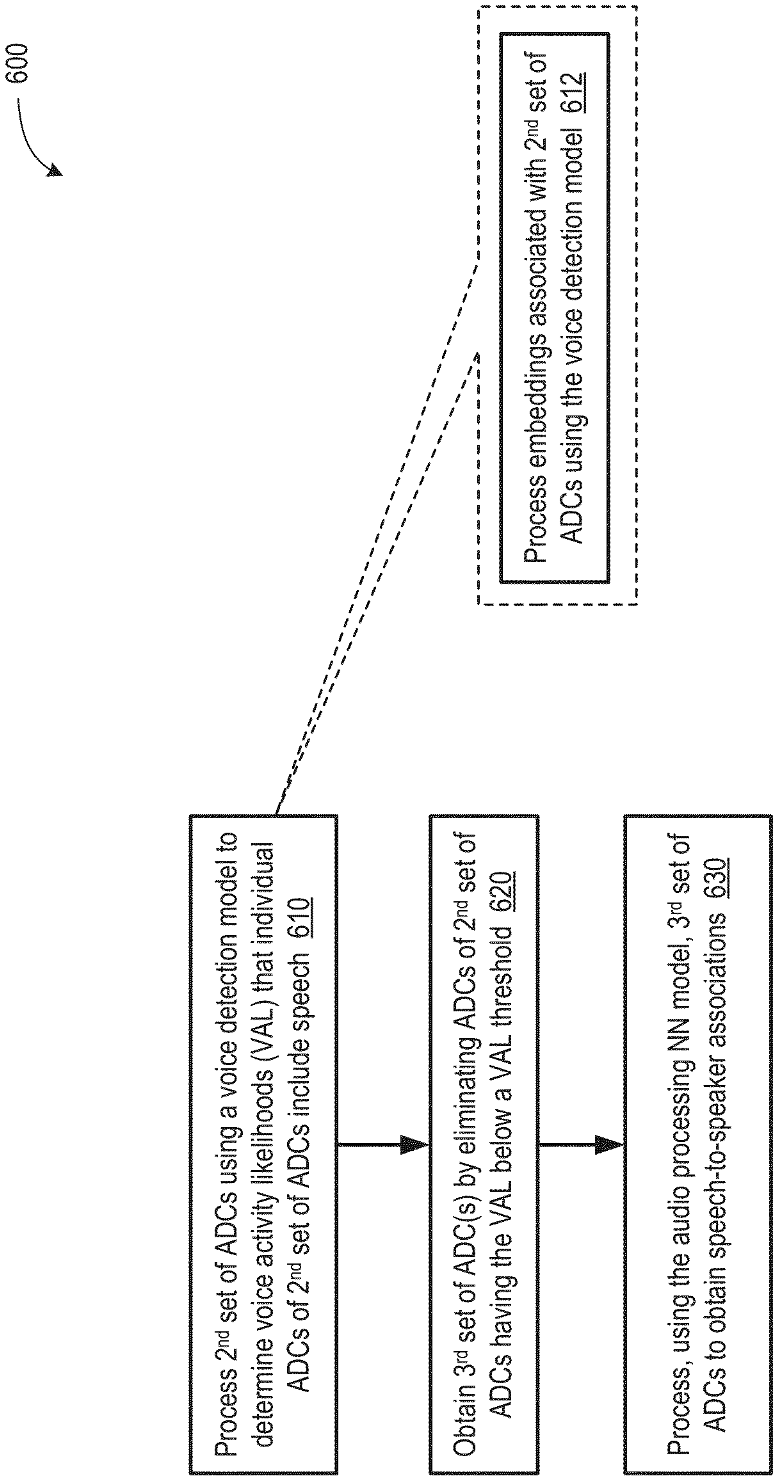
FIG. 6A is a flow diagram of an example method of performing channel mixing in the context of multi-channel multi-speaker identification, verification, and/or diarization, according to at least one embodiment.
Figure 6B:
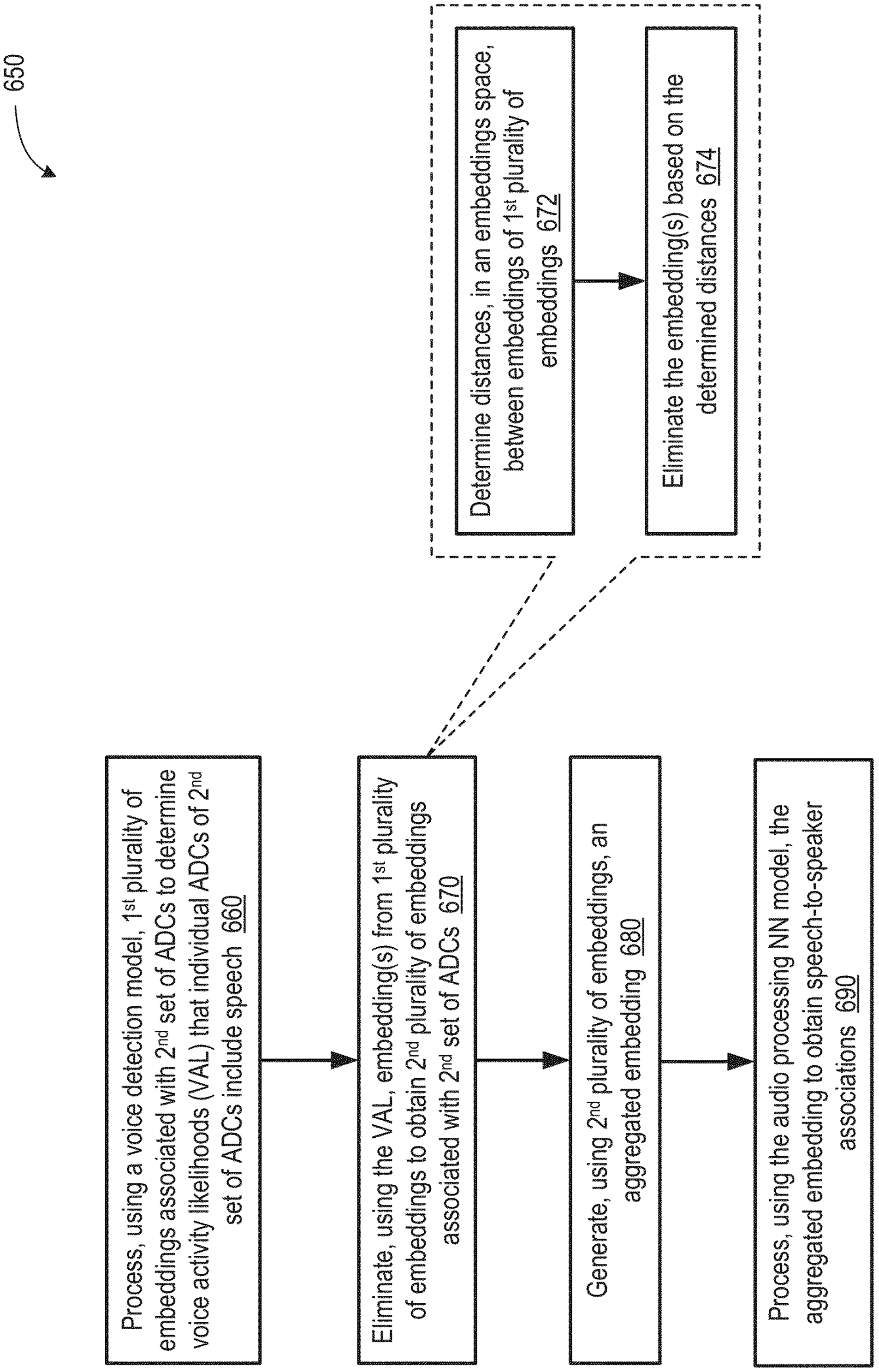
FIG. 6B is a flow diagram of an example method of performing embedding clustering in the context of multi-channel multi-speaker identification, verification, and/or diarization, according to at least one embodiment.

FIG. 5, FIG. 6A, and FIG. 6B are flow diagrams of respective methods 500, 600, and 650 that facilitate efficient multi-channel multi-speaker identification, verification, and/or diarization, according to at least one embodiment. Methods 500, 600, and 650 may be performed using one or more processing units (e.g., CPUs, GPUs, accelerators, PPUs, DPUs, etc.), which may include (or communicate with) one or more memory devices. In at least one embodiment, methods 500, 600, and 650 may be performed using processing units of audio processing server 102. In at least one embodiment, processing units performing any of methods 500, 600, and 650 may be executing instructions stored on a non-transient computer-readable storage media. In at least one embodiment, any of methods 500, 600, and 650 may be performed using multiple processing threads (e.g., CPU threads and/or GPU threads), individual threads executing one or more individual functions, routines, subroutines, or operations of the methods. In at least one embodiment, processing threads implementing any of methods 500, 600, and 650 may be synchronized (e.g., using semaphores, critical sections, and/or other thread synchronization mechanisms). Alternatively, processing threads implementing any of methods 500, 600, and 650 may be executed asynchronously with respect to each other. Various operations of any of methods 500, 600, and 650 may be performed in a different order compared with the order shown in FIG. 5, FIG. 6A, and FIG. 6B. Some operations of any of methods 500, 600, and 650 may be performed concurrently with other operations. In at least one embodiment, one or more operations shown in FIG. 5, FIG. 6A, and FIG. 6B may not always be performed.

Methods 500, 600, and 650 may be performed in the context of speech identification, speech verification, and/or speech diarization. Methods 500, 600, and 650 may involve speech utterances produced by people in any possible context, e.g., a conversation, a public speech, a public event, a business meeting, a conference, a street encounter, an interaction in a game, an interaction with a chat bot or digital avatar, an interaction with an in-vehicle infotainment system, and/or the like. "Speech," as used in the context of methods 500, 600, and 650 should be understood as also including sounds of non-human origins, e.g., sounds of animals. "Speech," as used in the context of methods 500, 600, and 650 should also be understood as including sounds produced by non-living entities, including natural forces, such as wind, sea, ocean, thunderstorms, and various other atmospheric or naval phenomena, as well as robotic speech, synthesized or computer-generated speech, and so on. "Speech," as used in the context of methods 500, 600, and 650 should further be understood as including artificial sounds, such as sounds of vehicles, industrial equipment, and so on. Similarly, a "speaker" should be understood as any entity (real or virtual, living or nonliving) that generates speech.

FIG. 5 is a flow diagram of an example method 500 of efficient multi-channel multi-speaker identification, verification, and/or diarization, according to at least one embodiment. One or more operations of method 500 may be performed by channel clustering 120 and audio processing model 128 of FIG. 1 and FIG. 2. At block 510, one or more processing units executing method 500 may receive a first set of audio data channels (ADCs) jointly capturing a speech produced by one or more speakers (e.g., audio data 204 in FIG. 2 collected using multiple audio sensors 202). The first set of ADCs may include channels 302 illustrated in FIGS. 3A-3B.

At block 520, method 500 may continue with obtaining, using the first set of ADCs, a second set of one or more ADCs (e.g., combined channels 230 in FIGS. 3A-3B). Individual ADCs of the second set of ADCs may represent one or more channels of the first set of ADCs (e.g., combined channel A may represent channels 1, 2, and 5 while combined channel B may represent a single channel 2, with reference to FIGS. 3A-3B). At least one channel of the second set of ADCs (e.g., combined channels A and C in FIGS. 3A-3B) may represent a cluster of two or more ADCs of the first set of ADCs, the two of more ADCs being selected based on similarity of audio data of the two or more ADCs.

In some embodiments, obtaining the second set of ADCs may include operations illustrated with the top callout portion of FIG. 5. More specifically, at block 522, method 500 may include obtaining a similarity matrix (e.g., similarity matrix 310 in FIGS. 3A-3B). An element (j, k) of the similarity matrix may characterize similarity of the audio data of j-th ADC of the first set of ADC and the audio data of k-th ADC of the first set of ADC. At block 524, method 500 may include identifying, using the similarity matrix, one or more clusters of ADCs of the first set of ADCs. At block 526, method 500 may include using the one or more clusters of ADCs to obtain the second set of ADCs. For example, using a specific individual cluster of the one or more clusters of ADCs to obtain a respective ADC of the second set of ADCs may include aggregating the audio data of a plurality of ADCs of the individual cluster to obtain the audio data for the respective ADC of the second set of ADCs. In some embodiments, aggregating the audio data of the plurality of ADCs may include averaging the audio data of the plurality of ADCs or selecting the audio data of a maximum signal-to-noise ADC of the plurality of ADCs.

In some embodiments, as illustrated with the callout block 528, obtaining the second set of ADCs may include applying the audio data of the first set of ADCs to a clustering NN model. The input into the clustering NN model may include a plurality of input embeddings associated with the first set of ADCs and an output of the clustering NN model may include one or more output embeddings associated with the second set of ADCs. The clustering NN model may be trained to improve audio quality associated with an output into the clustering NN model compared with audio quality associated with an input into the clustering NN model.

At block 530, method 500 may continue with processing, using an audio processing neural network (NN) model (e.g., audio processing model 128 in FIG. 2), the second set of ADCs to obtain an association of the speech to the one or more speakers. In some embodiments, as illustrated with the callout block 532, processing the second set of ADCs to obtain the association of the speech to the one or more speakers may include partitioning the speech into one or more intervals. Individual intervals of the one or more intervals may be mapped to respective speakers that generated speech associated with the individual intervals (e.g., by assigning one or more speaker labels 250 in FIG. 2).

FIG. 6A is a flow diagram of an example method 600 of performing channel mixing in the context of multi-channel multi-speaker identification, verification, and/or diarization, according to at least one embodiment. One or more operations of method 600 may be performed by channel mixing 124 of FIG. 1A, FIG. 1B, and FIG. 2. At block 610, one or more processing units executing method 600 may process the second set of ADCs using a voice detection model (e.g., voice detection model 122 in FIG. 1A, FIG. 1B, and FIG. 2) to determine voice activity likelihoods (VAL) that individual ADCs of the second set of ADCs include speech (e.g., as illustrated in FIG. 3B for combined channels A . . . E). In some embodiments, as illustrated with the callout block 612, processing the second set of ADCs using the voice detection model may include using the voice detection model to process embeddings associated with the second set of ADCs.

At block 620, method 600 may continue with obtaining a third set of one or more ADCs by eliminating ADCs of the second set of ADCs having the VAL below a VAL threshold (e.g., eliminating combined channel B, as illustrated in FIG. 3B). In some embodiments, the third set of ADCs may include a single ADC obtained by aggregating (e.g., weighting), using the VALs, uneliminated ADCs of the second set of ADCs (e.g., by obtaining a mixed embedding 360, as illustrated in FIG. 3B). In some embodiments, the third set of ADCs may include two or more aggregated ADCs, each aggregated ADC represented by a separate mixed embedding. For example, aggregation of ADCs of the second set into ADCs of the third set may be performed using similarity (e.g., cosine similarity) of ADCs of the second set, with a first subset of ADCs of the second set having close mutual model can be a model that combines functions of voice detection model 122 and channel similarity being aggregated into a first ADC of the third set, a second subset of ADCs of the second set having close mutual similarity being aggregated into a second ADC of the third set, and/or the like. In some embodiments, aggregating ADCs of the second set of ADCs can be achieved using a trained neural network model. In some embodiments, this trained neural network model can use VALs outputted by voice detection model 122. In some embodiments, this trained neural network mixing 124 and outputs one or more mixed embeddings (for one or more ADCs of the third set of ADCs).

At block 630, method 600 may continue with the processing units using the audio processing NN model to process the third set of ADCs to obtain the association of the speech to the one or more speakers (e.g., by assigning one or more speaker labels 250 in FIG. 2).

FIG. 6B is a flow diagram of an example method 650 of performing embedding clustering in the context of multi-channel multi-speaker identification, verification, and/or diarization, according to at least one embodiment. One or more operations of method 650 may be performed by embeddings clustering 126 of FIG. 1A, FIG. 1B, and FIG. 2. At block 660, the processing units performing method 600 may process, using a voice detection model (e.g., voice detection model 122 of FIG. 1A, FIG. 1B, and FIG. 2), a first plurality of embeddings associated with the second set of ADCs to determine voice activity likelihoods (VAL) that individual ADCs of the second set of ADCs comprise speech.

At block 670, method 600 may continue with eliminating, using the VAL, one or more embeddings from the first plurality of embeddings to obtain a second plurality of embeddings associated with the second set of ADCs. For example, two embeddings associated with the respective combined channels may be eliminated for each timestamp, as illustrated in FIG. 3B. In some embodiments, the second plurality of embeddings may have a predetermined number of embeddings (e.g., the first plurality of embeddings may have N embeddings and the second plurality of embeddings may have K embeddings).

In some embodiments, eliminating the one or more embeddings from the first plurality of embeddings may include operations illustrated in the callout portion of FIG. 6B. For example, at block 672, method 600 may include determining distances, in an embeddings space, between embeddings of the first plurality of embeddings. At block 674, the one or more embeddings may be eliminated based on the determined distances (e.g., N-K embeddings having the longest distances—or the lowest similarity—to the other K embeddings) may be eliminated (e.g., for a given timestamp).

At block 680, method 650 may continue with generating, using the second plurality of embeddings, an aggregated embedding (e.g., aggregated embedding 381 in FIG. 3C). In some embodiments, a separate aggregated embedding is generated individually for a given temporal unit of the speech (e.g., aggregated embedding 381 is generated for time $T_1$, aggregated embedding 382 is generated for time T2, aggregated embedding 383 is generated for time T3, and aggregated embedding 384 is generated for time $T_4$). At block 690, method 600 may continue with processing, using the audio processing NN model, the aggregated embedding to obtain the association of the speech to the one or more speakers (e.g., by assigning one or more speaker labels 250 in FIG. 2).

The systems and methods described herein may be used for a variety of purposes, by way of example and without limitation, for performing one or more operations with respect to machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Inference and Training Logic

Figure 7A:
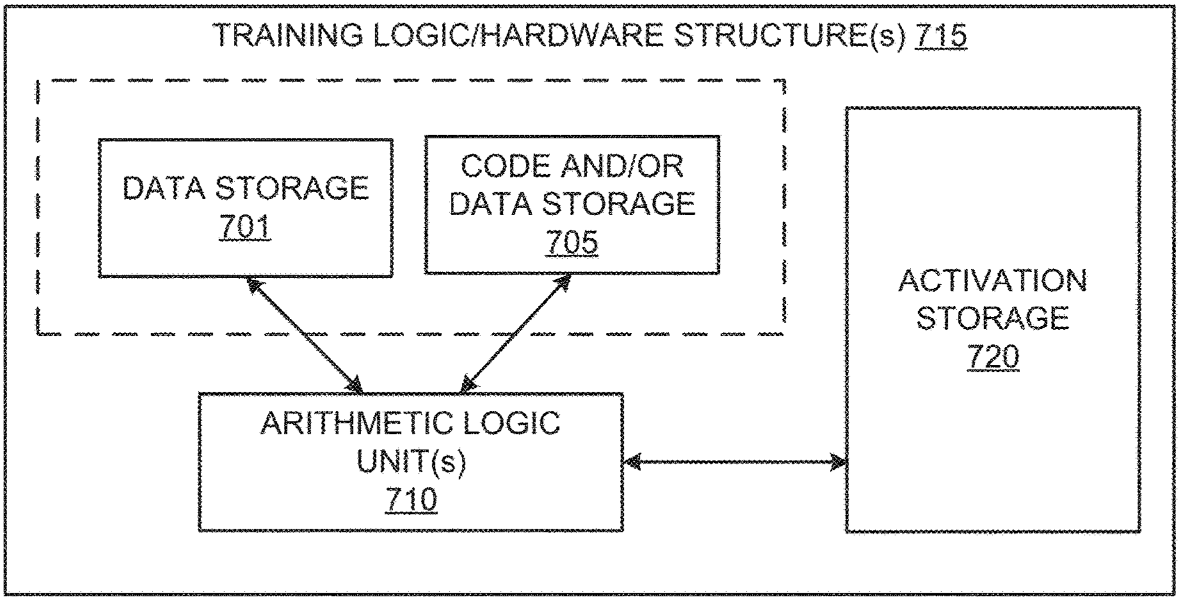
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
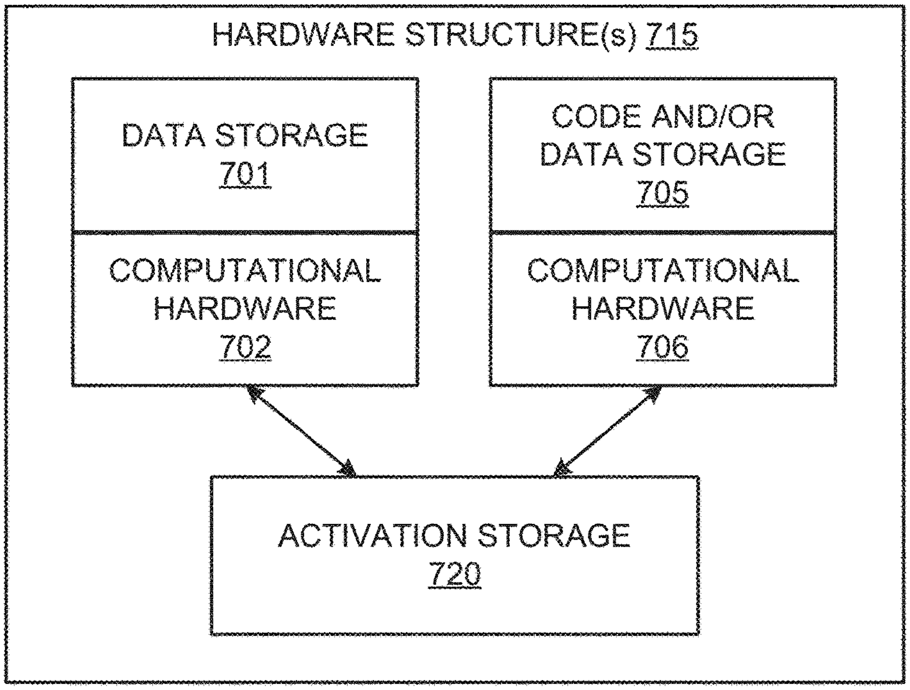
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
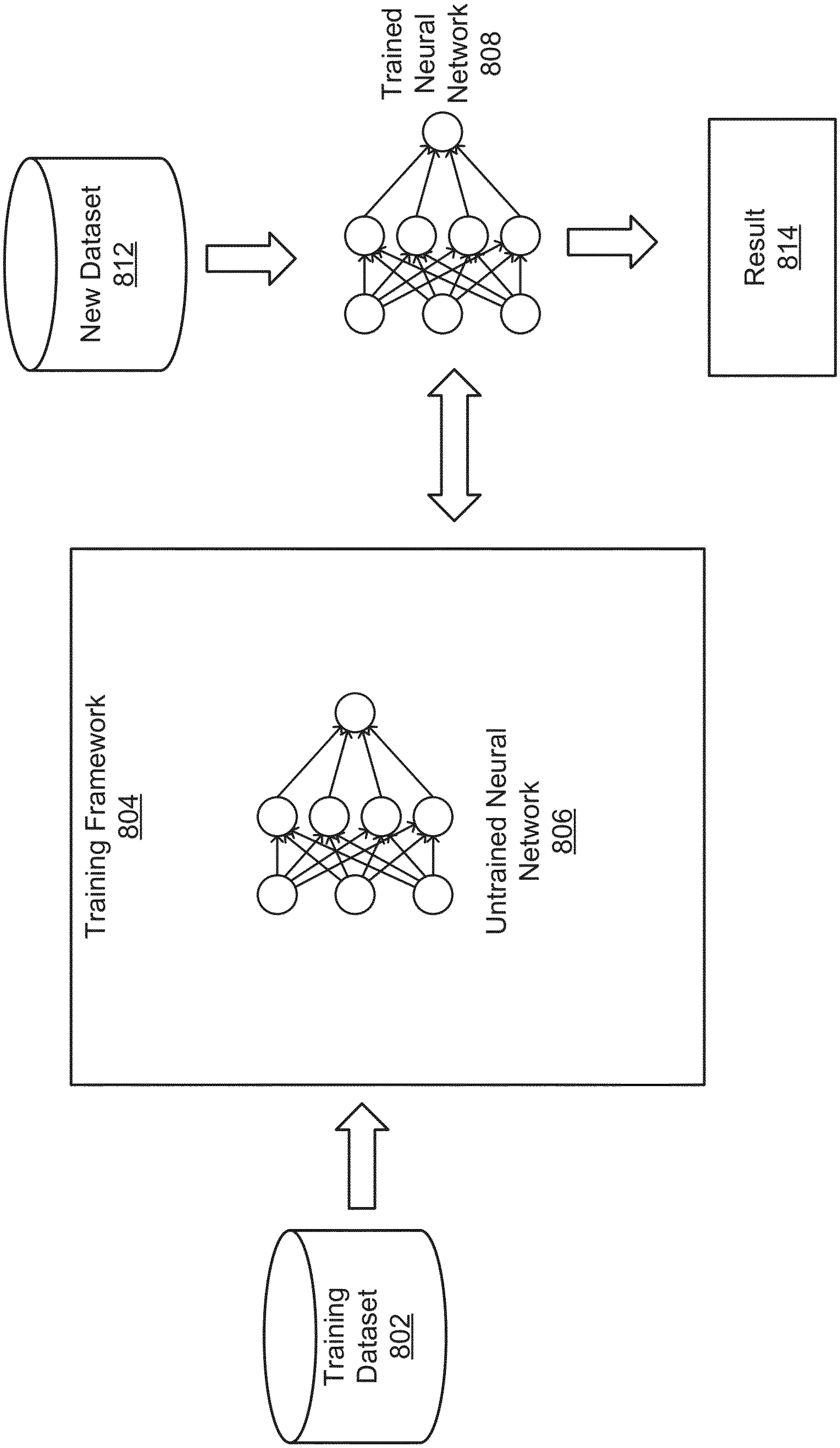
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or “ground truth” data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
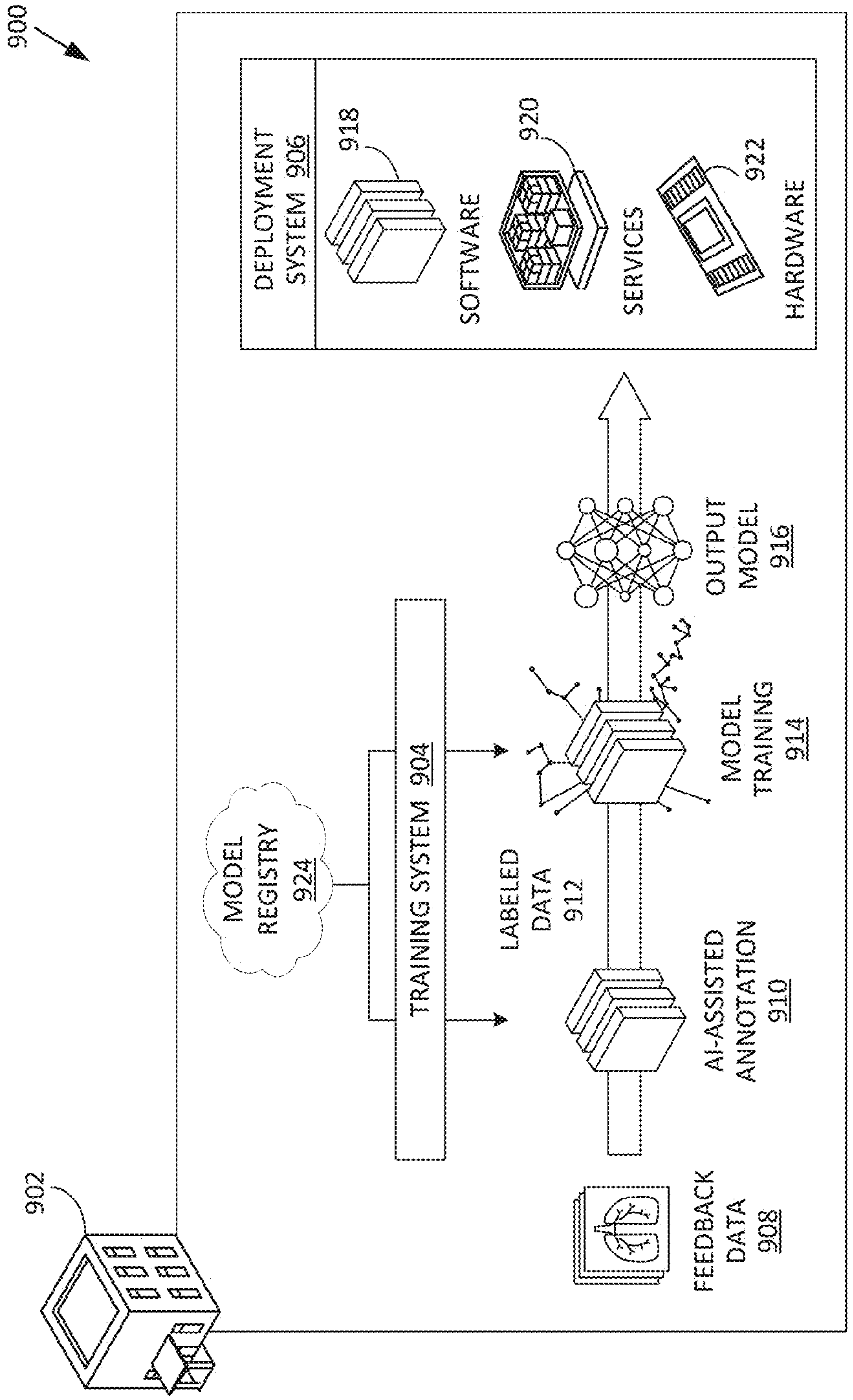
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
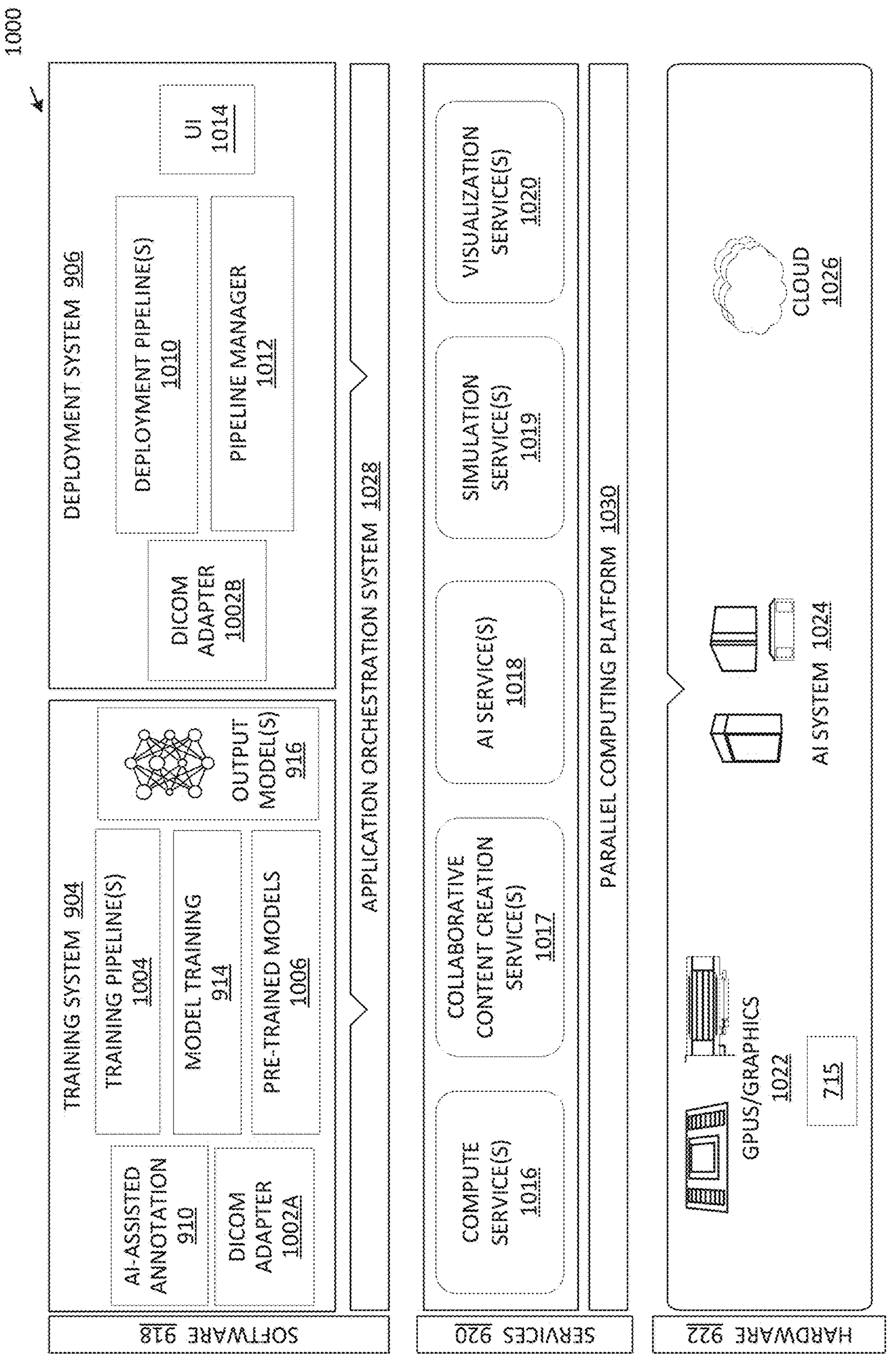
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and intera with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904. In at least one embodiment, training system 904 and deployment system 906 may include DICOM adapters 1002A and 1002B.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA®) and/or QUADRO® GPUs)

may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. $N_0$ language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

receiving a first set of audio data channels (ADCs) jointly capturing a speech produced by one or more speakers;

obtaining, using the first set of ADCs, a second set of ADCs, at least one ADC of the second set of ADCs representing a cluster of two or more ADCs of the first set of ADCs, the two or more ADCs of the first set of ADCs being selected based at least on a similarity of audio data of the two or more ADCs of the first set of ADCs;

processing the second set of ADCs using a voice detection model to determine a set of voice activity likelihoods (VALs) that individual ADCs of the second set of ADCs comprise the speech;

combining a set of embeddings associated with the second set of ADCs to obtain one or more mixed embeddings, wherein combining the set of embeddings comprises multiplying each embedding of the set of embeddings by a respective VAL of the set of VALs; and processing, using an audio processing neural network (NN) model, the third set of one or more mixed embeddings to obtain one or more associations of the speech to the one or more speakers.

2. The method of claim 1, wherein the obtaining the second set of one or more ADCs comprises:

obtaining a similarity matrix, wherein an element (j, k) of the similarity matrix characterizes similarity of the audio data of j-th ADC of the first set of ADCs and the audio data of k-th ADC of the first set of ADCs;

identifying, using the similarity matrix, one or more clusters of ADCs of the first set of ADCs; and using the one or more clusters of ADCs to obtain the second set of one or more ADCs.

3. The method of claim 2, wherein using an individual cluster of the one or more clusters of ADCs to obtain a respective ADC of the second set of one or more ADCs comprises:

aggregating the audio data of a plurality of ADCs of the individual cluster to obtain the audio data for the respective ADC of the second set of one or more ADCs, wherein aggregating the audio data of the plurality of ADCs comprises at least one of:

combining the audio data of the plurality of ADCs, or selecting the audio data of a maximum signal-to-noise ADC of the plurality of ADCs.

4. The method of claim 1, wherein the obtaining the second set of ADCs comprises:

applying the audio data of the first set of ADCs to a clustering NN model.

5. The method of claim 4, wherein the clustering NN model is trained to improve an audio quality associated with an output of the clustering NN model compared with the audio quality associated with an input into the clustering NN model, wherein the input into the clustering NN model comprises a set of input embeddings associated with the first set of ADCs, and wherein an output of the clustering NN model comprises the set of embeddings associated with the second set of ADCs.

6. The method of claim 1, wherein combining the set of embeddings further comprises:

eliminating, prior to the multiplying, one or more embeddings from the set of embeddings, the one or more embeddings corresponding to ADCs of the second set of ADCs having the VAL below a VAL threshold.

7. The method of claim 6, wherein the processing the second set of ADCs using the voice detection model comprises processing the set of embeddings associated with the second set of ADCs using the voice detection model.

8. The method of claim 6, wherein individual mixed embeddings of the one or more mixed embeddings are associated with respective times of the speech.

9. The method of claim 1, wherein the processing the second set of ADCs using the voice detection model comprises:

inputting, into the voice detection model, an initial set of embeddings associated with the second set of ADCs to determine the set of VALS;

and wherein processing the one or more mixed embeddings comprises inputting, into the audio processing NN model, the one or more mixed embeddings to obtain the one or more associations of the speech to the one or more speakers.

10. The method of claim 9, wherein the set of embeddings has a predetermined number of embeddings.

11. The method of claim 9, wherein the one or more mixed embeddings are generated individually for a given temporal unit of the speech.

12. The method of claim 6, wherein the eliminating the one or more embeddings from the set of embeddings comprises:

determining distances, in an embedding space, between the set of embeddings; and eliminating the one or more embeddings based on the determined distances.

13. The method of claim 1, wherein the processing the one or more mixed embeddings to obtain the one or more associations of the speech to the one or more speakers comprises:

partitioning the speech into one or more intervals, wherein individual intervals of the one or more intervals are mapped to respective speakers who generated speech associated with the individual intervals.

14. A system comprising:

one or more processing units to:

receive a first set of audio data channels (ADCs) jointly capturing a speech produced by one or more speakers;

obtain, using the first set of ADCs, a second set of ADCs, at least one ADC of the second set of ADCs representing a cluster of two or more ADCs of the first set of ADCs, the two or more ADCs of the first set of ADCs being selected based at least on a similarity of audio data of the two or more ADCs of the first set of ADCs;

process the second set of ADCs using a voice detection model to determine a set of voice activity likelihoods (VALs) that individual ADCs of the second set of ADCs comprise the speech;

generate one or more mixed embeddings associated with the second set of ADCs, wherein generating the one or more mixed embeddings comprises multiplying each embedding of the set of embeddings by a respective VAL of the set of VALs; and process, using an audio processing neural network (NN) model, the one or more mixed embeddings to obtain one or more associations of the speech to the one or more speakers.

15. The system of claim 14, wherein to obtain the second set of ADCs, the one or more processing units are to:

obtain a similarity matrix, wherein an element (j, k) of the similarity matrix characterizes similarity of the audio data of j-th ADC of the first set of ADCs and the audio data of k-th ADC of the first set of ADCs;

identify, using the similarity matrix, one or more clusters of ADCs of the first set of ADCs; and use the one or more clusters of ADCs to obtain the second set of ADCs.

16. The system of claim 15, wherein to use an individual cluster of the one or more clusters of ADCs to obtain a respective ADC of the second set of ADCs, the one or more processing units are to:

aggregate the audio data of a plurality of ADCs of the individual cluster to obtain the audio data for the respective ADC of the second set of ADCs, wherein aggregating the audio data of the plurality of ADCs comprises at least one of:

combine the audio data of the plurality of ADCs, or select the audio data of a maximum signal-to-noise ADC of the plurality of ADCs.

17. The system of claim 14, wherein to generate the one or more mixed embeddings, the one or more processing units are to:

eliminate, prior to the multiplying, one or more embeddings from the set of embeddings, the one or more embeddings corresponding to ADCs of the second set of ADCs having a respective VAL below a VAL threshold.

18. The system of claim 14, wherein to process the second set of ADCs using the voice detection model, the one or more processing units are to:

input, into a voice detection model, an initial set of embeddings associated with the second set of ADCs to determine the set of VALs;

and wherein to process the one or more mixed embeddings, the one or more processing units are to cause inputting, into the audio processing NN model, the one or more mixed embeddings to obtain the one or more associations of the speech to the one or more speakers.

19. The system of claim 14, wherein the system is comprised in at least one of:

an in-vehicle infotainment system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system for generating or presenting at least one of virtual reality content, mixed reality content, or augmented reality content;

a system implemented using a robot;

a system for performing one or more conversational AI operations;

a system implementing one or more large language models (LLMs);

a system implementing one or more language models;

a system for performing one or more generative AI operations;

a system for generating synthetic data;

a system incorporating one or more virtual machines (VMs);

a system implemented at least partially in a data center; or a system implemented at least partially using cloud computing resources.

20. A processing device to:

receive a first set of audio data channels (ADCs), wherein the first set of ADCs jointly capture a speech produced by one or more speakers;

obtain, using the first set of ADCs, a second set of ADCs, at least one ADC of the second set of ADCs representing a cluster of two or more ADCs of the first set of ADCs, the two or more ADCs of the first set of ADCs being selected based at least on a similarity of audio data of the two or more ADCs of the first set of ADCs;

process the second set of ADCs using a voice detection model to determine a set of voice activity likelihoods (VALs) that individual ADCs of the second set of ADCs comprise the speech;

combine a set of embeddings associated with, the second set of ADCs to obtain one or more mixed embeddings, wherein combining the set of embeddings comprises multiplying each embedding of the set of embeddings by a respective VAL of the set of VALs; and process, using an audio processing neural network (NN) model, the one or more mixed embeddings to obtain one or more associations of the speech to the one or more speakers.

* * * * *